United States Patent [19]

Aritake et al.

[11] Patent Number: 5,617,225
[45] Date of Patent: Apr. 1, 1997

[54] STEREOSCOPIC DISPLAY APPARATUS AND METHOD

[75] Inventors: Hirokazu Aritake; Masayuki Kato; Manabu Ishimoto; Noriko Sato; Masato Nakashima, all of Kawasaki, Japan

[73] Assignee: Fujitsu Limited, Kanagawa, Japan

[21] Appl. No.: 479,838

[22] Filed: Jun. 7, 1995

Related U.S. Application Data

[63] Continuation of Ser. No. 88,753, Jul. 8, 1993, abandoned.

[30] Foreign Application Priority Data

Jul. 20, 1992 [JP] Japan .................................. 4-191782

[51] Int. Cl.$^6$ .................................................. G03H 1/08
[52] U.S. Cl. .................................................. 359/9; 359/23
[58] Field of Search .......................... 359/9, 23, 1, 3, 359/15, 22

[56] References Cited

U.S. PATENT DOCUMENTS

| | | | |
|---|---|---|---|
| 4,701,006 | 10/1987 | Perlmutter | 359/9 |
| 4,778,262 | 10/1988 | Haines | 359/23 |
| 4,969,700 | 11/1990 | Haines | 359/9 |
| 5,058,992 | 10/1991 | Takahashi | 359/9 |
| 5,117,296 | 5/1992 | Hoebing | 359/21 |
| 5,132,812 | 7/1992 | Takahashi et al. | 359/9 |
| 5,138,471 | 8/1992 | McGrew | 359/21 |
| 5,194,971 | 3/1993 | Haines | 359/9 |
| 5,237,433 | 8/1993 | Haines et al. | 359/9 |
| 5,347,375 | 9/1994 | Saito et al. | 359/9 |
| 5,400,155 | 3/1995 | Ueda et al. | 359/9 |
| 5,436,740 | 7/1995 | Nakagawa et al. | 359/9 |
| 5,483,364 | 1/1996 | Ishimoto et al. | 359/9 |
| 5,513,020 | 4/1996 | Kato et al. | 359/9 |

OTHER PUBLICATIONS

"Optimization of Hologram Computation for Real-Time Display", Mark Lucente, Practical Holography, vol. 1667, Feb., 1992, pp. 32–43.

Primary Examiner—Paul M. Dzierzynski
Assistant Examiner—Darren E. Schuberg

[57] ABSTRACT

A plurality of 2-dimensional images of different visual directions, when an object to be displayed is seen from different directions, are inputted to an input section by photographing an object using cameras. The 2-dimensional images are then subjected to enlargement, reduction, and movement of the coordinate position, thereby adjusting the size and position of the solid image. A phase distribution at a hologram forming surface is then calculated by a phase calculating section. The phase distribution is calculated from a plurality of 2-dimensional images of red, green, and blue components, and the reproduction light of each color is irradiated, thereby displaying a color solid image. The calculated phase distribution is expressed on a hologram forming surface of a phase expressing section using a display. A reproduction light is then irradiated and converted into an optical wave front, to thereby display a solid image. The 2-dimensional images obtained by photographing can be also formed by interpolating calculations from the two 2-dimensional images which were acctually photographed.

13 Claims, 37 Drawing Sheets

WAVE LENGTH $\lambda$

FIG.58
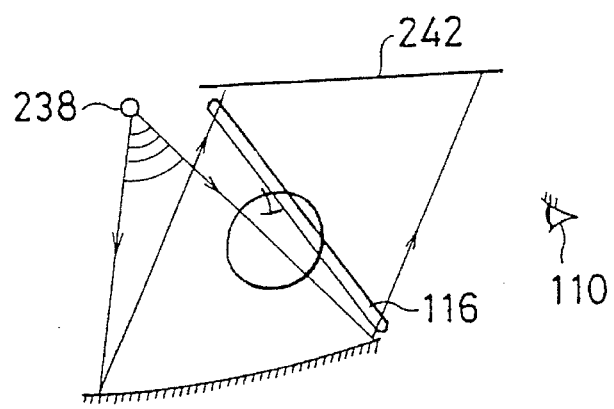
FIG.59
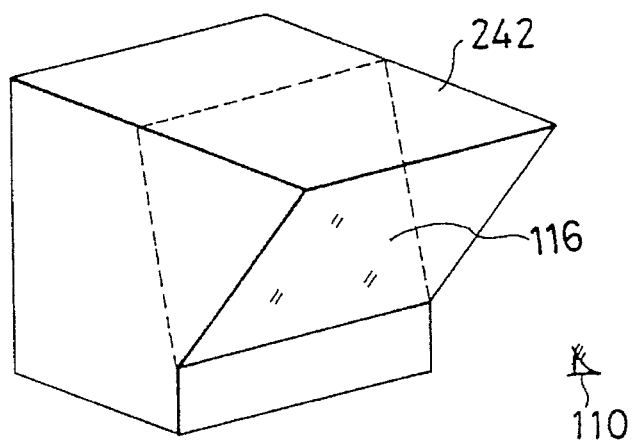
FIG.60  FIG.61
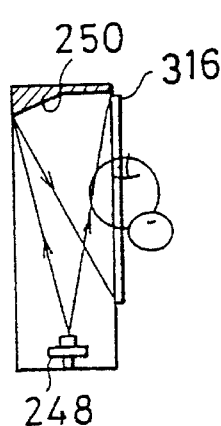 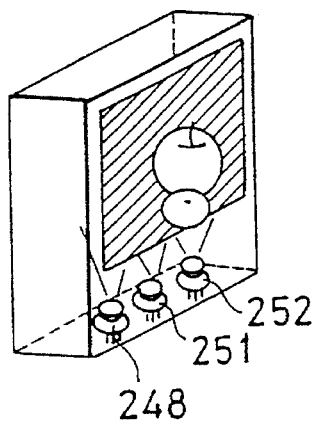

STEREOSCOPIC DISPLAY APPARATUS AND METHOD

This is a continuation of application Ser. No. 08/088,753, filed Jul. 8, 1993 now abandoned.

BACKGROUND OF THE INVENTION

The present invention relates to a stereoscopic display apparatus and method for forming a hologram the basis of a plurality of two-dimensional images and displaying a solid image and, more particularly, to a stereoscopic display apparatus and method which can calculate a phase distribution of a hologram by using a computer.

Hitherto, various studies and developments of a display apparatus which can display a stereoscopic image have been performed. An example of a conventional stereoscopic display apparatus is an apparatus of the double-eye type represented by a glasses system. Different video images are observed by the right and left eyes, thereby obtaining a stereoscopic feeling on the basis of vergence of two eyes or a parallax of two eyes. Although there is a multieye type lenticular system as an extension of the double-eye type, the principle of stereoscopic observation is the same as that of the double-eye type.

In such a conventional stereoscopic display apparatus, even when the observer moves the head to the right and left, no difference occurs between the observing states of a solid being observed, so that only an unnatural solid image can be seen. A holographic stereogram can be used for eliminating those drawbacks. According to the holographic stereogram, a 2-dimensional video image including a parallax is recorded in a slit-shaped segment hologram which is elongated in the vertical direction and a number of segment holograms are arranged in the horizontal direction. Therefore, when the observer moves the head to the right and left, the observing skates of the image differs depending on the position, so that a natural stereoscopic feeling can be obtained. There is also a holographic stereogram including a parallax in the vertical direction. However, the conventional holographic stereogram has been recorded on a film and there is not an effective system which can display in a real-time manner.

SUMMARY OF THE INVENTION

According to the stereoscopic display apparatus and method of the present invention, a stereoscopic display using a hologram which can also express a moving image can be realized by an electronic method.

A stereoscopic display apparatus of the present invention first has an input section for inputting a plurality of 2-dimensional images whose visual directions are different when an object to be displayed is seen from different directions. On the basis of a plurality of 2-dimensional images inputted from the input section, a phase calculating section calculates a phase distribution on a hologram forming surface. The phase distribution calculated by the phase calculating section is expressed on the hologram forming surface of a phase expressing section using a display. A solid image is displayed by irradiating a reproduction light (or reconstruction light) from an illuminating section and by converting it into an optical wave front. An object to be displayed is photographed by a plurality of cameras set at different positions, thereby inputting 2-dimensional images. When a 2-dimensional image is formed, on the basis of the adjacent 2-dimensional images which were actually photographed, a 2-dimensional image between those two images can be also produced by an interpolating calculation. The input section produces 3-dimensional information on the basis of a plurality of 2-dimensional images which were photographed from arbitrary positions for an object to be expressed and can also produce a plurality of 2-dimensional images of different visual directions from the 3-dimensional information. Further, a 2-dimensional image of different visual directions can be also enlarged or reduced or the coordinate position can be moved. In the calculation of the phase distribution, the phase distribution based on a plurality of 2-dimensional images is sequentially calculated for every hologram segment obtained by finely dividing the hologram forming surface. In this case, a calculation amount can be reduced by calculating the phase distribution with respect to only the hologram segments in a region that are decided by a designated virtual opening. Further, a calculation amount can also be reduced even by calculating the phase distribution with respect to the pixels of the portion in which an image exists with regard to a 2-dimensional image. As for the expression of the phase distribution obtained by the calculation, a phase of reproduction light is spatially modulated or an amplitude of reproduction light is modulated and a solid image is recognized by the conversion of the optical wave front by the irradiation of the reproduction light for such a spatial modulation or amplitude modulation. Further, a plurality of 2-dimensional images of different visual directions are inputted every plurality of colors and a phase distribution is calculated every color. Further, in a state in which the calculated phase distributions are expressed on the hologram forming surface every color, the reproduction light of each color is irradiated and the reproduction lights are converted into optical wave fronts, thereby enabling a color solid image to be displayed.

According to the invention as mentioned above, the phase distribution is calculated from a group of 2-dimensional images of different visual directions and the reproduction light is modulated on the basis of the phase distribution and converted into the optical wave front, so that a monochromatic solid image or a color solid image can be displayed in a real-time manner. Not only a still image but also a moving image can be displayed in a real-time manner.

The above and other objects, features, and advantages of the present invention will become more apparent from the following detailed descriptions with reference to the drawings.

BRIEF DESCRIPTION OF THE DRAWINGS

FIG. 58 is an explanatory diagram of an internal structure of a stereoscopic display apparatus of the invention;

FIG. 59 is an external explanatory view of FIG. 58;

FIG. 60 is an explanatory diagram showing another internal structure of a stereoscopic display apparatus of the invention;

FIG. 61 is an external explanatory diagram of FIG. 60;

DETAILED DESCRIPTION OF THE PREFERRED EMBODIMENTS

Figure 1:
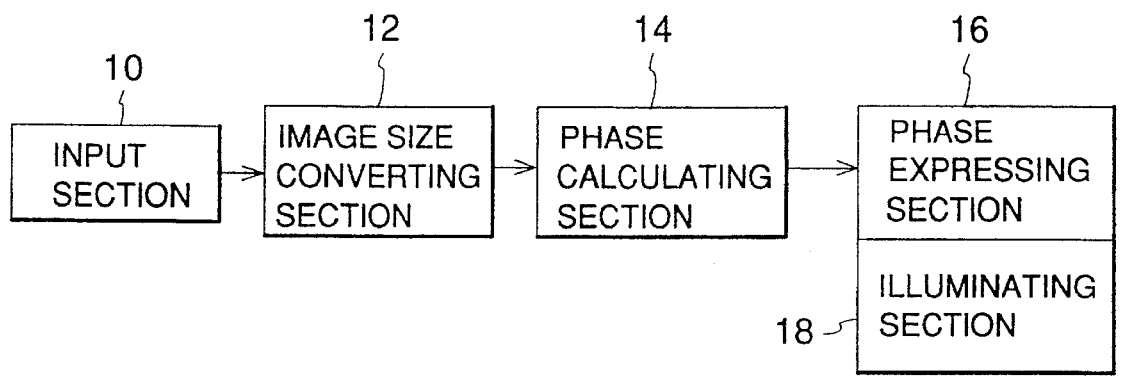
FIG. 1 is a block diagram showing the first embodiment of the invention.
Figure 5:
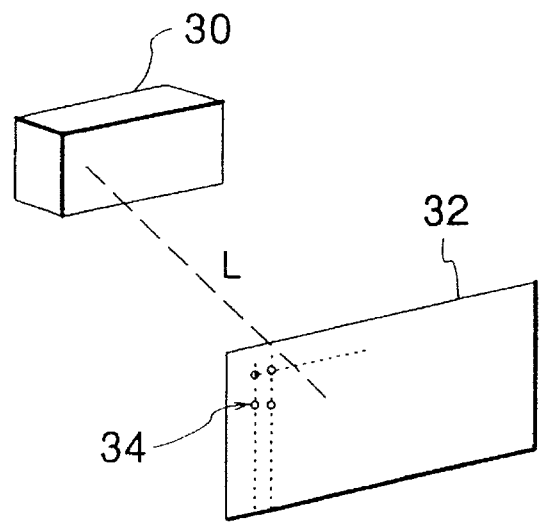
FIG. 5 is a diagram for explaining a method of forming a 2-dimensional image by a camera.
Figure 6:
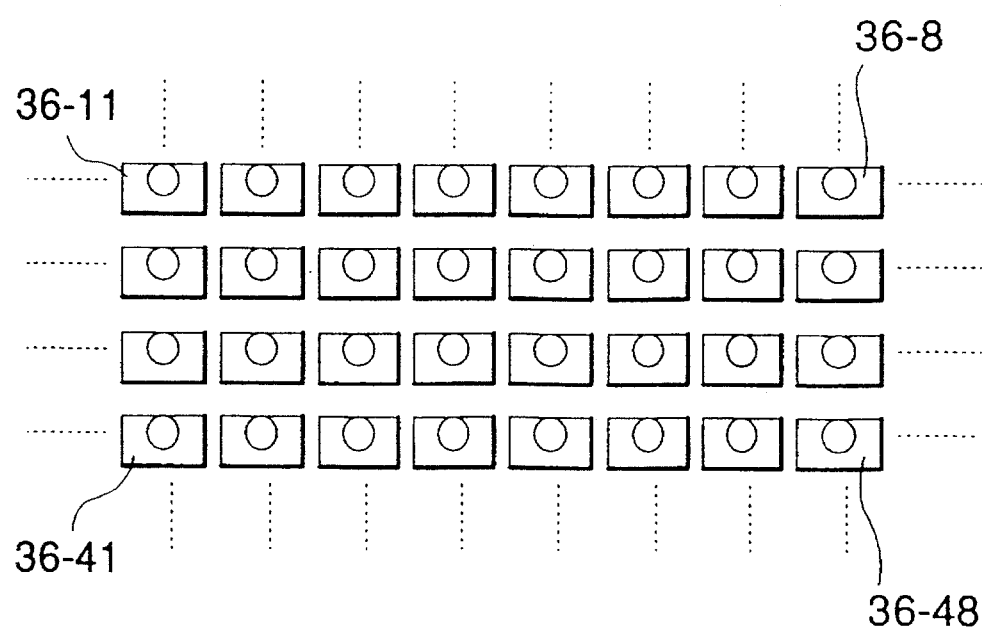
FIG. 6 is an explanatory diagram of a camera arrangement in FIG. 5.

FIG. 1 shows the first embodiment of the invention. 2-dimensional images which are necessary to calculate a phase distribution are photographed by a plurality of cameras. First, an input section 10 fetches a plurality of 2-dimensional images of an object. For example, as shown in FIG. 5, a plurality of camera positions 34 are set on a camera arranging surface 32. 2-dimensional images of an object 30 photographed by a plurality of cameras set at the different camera positions 34 are fetched. For instance, as shown in FIG. 6, a plurality of cameras 36-11 to 36-48 are arranged on the camera arranging surface 32 at regular intervals in the horizontal and vertical directions. An image size converting section 12 enlarges or reduces the 2-dimensional images inputted from the input section 10 or moves the coordinates of them. A phase calculating section 14 calculates a phase distribution on a hologram forming surface from a plurality of 2-dimensional images obtained through the image size converting section 12. A phase expressing section 16 expresses the phase distribution calculated by the phase calculating section 14 onto the hologram surface and uses a phase display for spatially modulating the reproduction light and converting into the wave front. An illuminating section 18 generates a reproduction light and irradiates according to the phase distribution expressed by the phase expressing section 16, thereby allowing a solid image to be recognized by the observer of the wave front conversion. The operation of the embodiment of FIG. 1 will now be described. A plurality of 2-dimensional images which were photographed by a plurality of cameras are fetched by the input section 10 and are subjected to a process such as enlargement, reduction, or movement of the coordinates as necessary by the image size converting section 12. The phase calculating section 14 subsequently calculates a phase distribution from the plurality of 2-dimensional images and expresses on the phase expressing section 16 in accordance with the phase distribution. By phase modulating the reproduction light (or reconstruction light) from the illuminating section 18, a solid image is displayed in a real-time manner.

Figure 2:
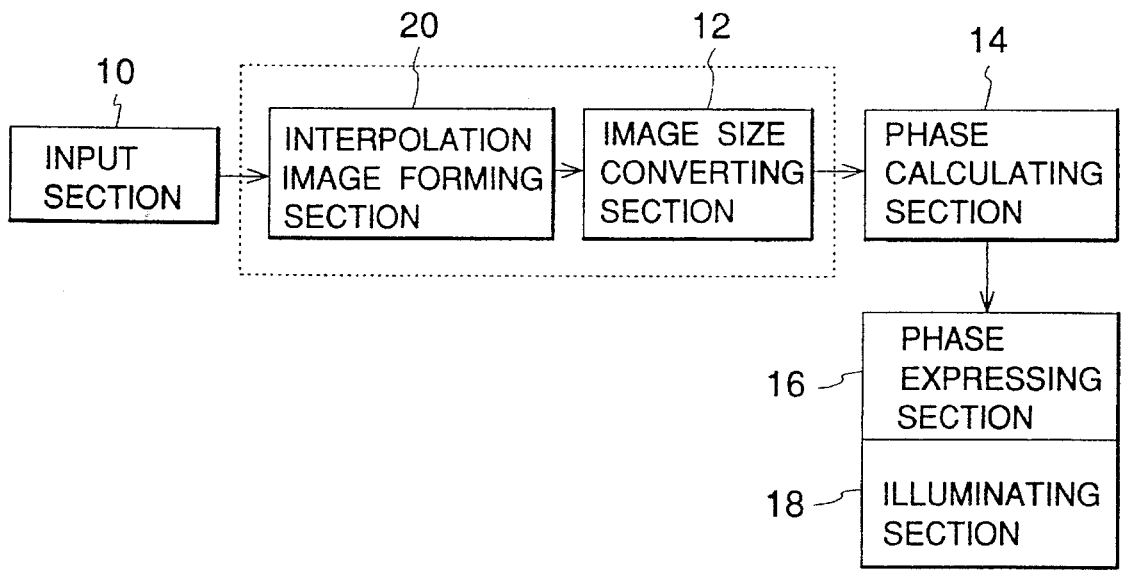
FIG. 2 is a block diagram showing the second embodiment of the invention.

FIG. 2 shows the second embodiment of the invention for producing a 2-dimensional image by an interpolating process. As will be explained hereinafter, an interpolation image forming section 20, which is newly provided, forms new 2-dimensional images existing between two adjacent 2-dimensional images locating at arbitrary positions by interpolating calculations from those two adjacent 2-dimensional images, thereby forming 2-dimensional images of the number necessary for a stereoscopic display. The image size converting section 12, phase calculating section 14, phase expressing section 16, and illuminating section 18 are the same as those shown in FIG. 1. In the operation of the embodiment of FIG. 2, 2-dimensional images at arbitrary positions, which were photographed by the cameras, are fetched by the input section 10. A 2-dimensional image at the position of which the camera doesn't photograph is formed by the interpolation image forming section 20 by an interpolating calculation based upon two 2-dimensional images which were photographed at both of the neighboring positions. Subsequently, the image size converting section 12 executes the enlargement, reduction, or coordinates movement as necessary. The phase calculating section 14 obtains a phase distribution by calculating the phases on the hologram forming surface. The phase distribution calculated by the phase calculating section 14 is expressed on the phase expressing section 16. The reproduction light from the illuminating section 18 is phase modulated and a solid image is displayed in a real-time manner.

Figure 3:
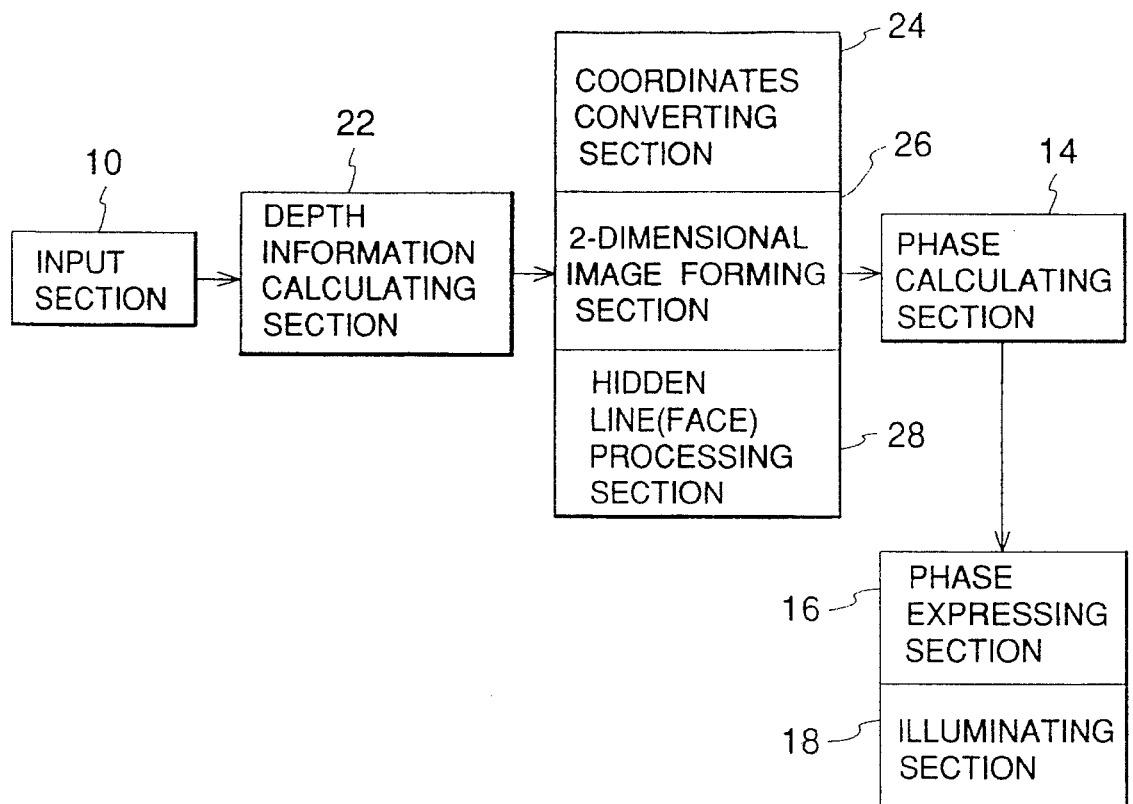
FIG. 3 is a block diagram showing the third embodiment of the invention.

FIG. 3 shows the third embodiment of the invention for performing an inputting process of the depth information. As will be explained hereinafter, 2-dimensional images of the number necessary to calculate the phase distribution are formed on the basis of 3-dimensional information (x, y, z) including the 2-dimensional image at an arbitrary position and a depth value (z). The input section 10 fetches the 2-dimensional image at an arbitrary position of the object and fetches the 2-dimensional images of the object which was photographed by at least two cameras. A depth information calculating section 22 calculates directly or by a triangulation the depth information (z) of the object photographed on the 2-dimensional image. A coordinates converting section 24 obtains the 3-dimensional information (x, y, z) including the depth information (z) derived from the 2-dimensional image. A 2-dimensional image forming section 26 produces the 2-dimensional images of the number necessary for the phase calculation from the 3-dimensional information. A hidden image processing section 28 executes a process to erase a line or plane of the portion which is not seen by the comparison of the depth information. The phase calculating section 14, phase expressing section 16, and illuminating section 18 are the same as those shown in FIG. 1. In the operation of the embodiment of FIG. 3, a plurality of 2-dimensional images which were photographed by the cameras are fetched by the input section 10. The 3-dimensional information (x, y, z) is produced on the basis of the 2-dimensional images and the depth information (z). After the 2-dimensional images of the necessary number were produced from the 3-dimensional information, the phase distribution is calculated by the phase calculating section 14. The phase distribution which was finally calculated is expressed by the phase expressing section 16. The reproduction light from the illuminating section 18 is phase modulated and a solid image is displayed in a real-time manner.

Figure 4:
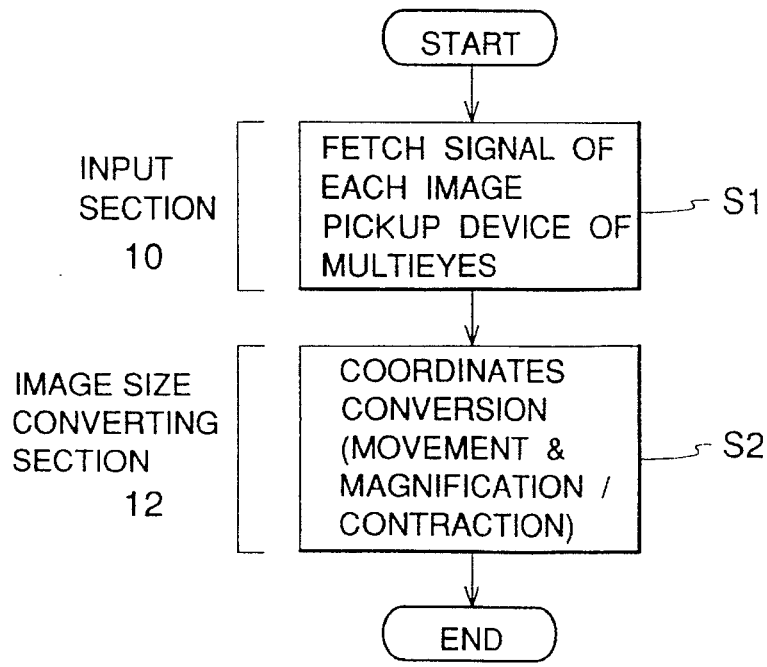
FIG. 4 is a flowchart showing image inputting processes according to the invention.

The input section 10 in each of the embodiments shown in FIGS. 1 to 3 will now be described in detail. FIG. 4 shows inputting processes of a 2-dimensional image by the input section 10 when it is seen by multieyes. First, in step S1, an image pickup device of each camera is driven and the signal is fetched. For example, the image pickup devices such as CCDs or the like provided in a number of cameras arranged at the camera positions 34 in FIG. 5 are driven. The 2-dimensional images which are obtained by photographing the object 30 from different positions are fetched, thereby obtaining 2-dimensional images of the number necessary for phase calculation. In the next step S2, a plurality of 2-dimensional images fetched in step S1 are subjected to a process such as movement, enlargement, or reduction as necessary, thereby executing the coordinate conversion to a proper size on the image.

FIG. 5 shows a specific example of the formation of a 2-dimensional image by the input section 10. In this case, as shown in FIG. 6, a plurality of cameras 36-11 to 36-48 are two-dimensionally arranged on the camera arranging surface 32 that is away from the object 30 by only a distance L. The object 30 is photographed in a lump by a plurality of cameras 36-11 to 36-48 arranged as mentioned above, thereby obtaining 2-dimensional images of the number necessary for the phase calculations.

Figure 7:
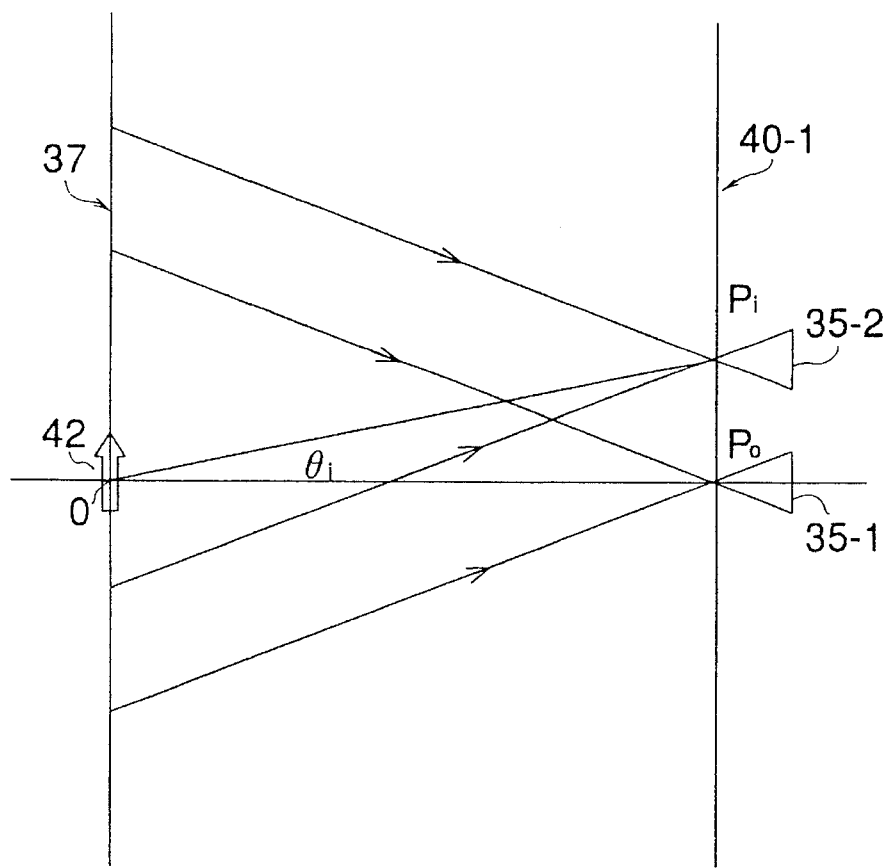
FIG. 7 is an explanatory diagram showing the optical relation between the image display surface and the hologram forming surface.

FIG. 7 is a diagram for explaining the conversion of the 2-dimensional image in the image size converting section 12 in FIGS. 1 and 2. In the coordinates conversion, enlargement, reduction, or movement of the 2-dimensional image is executed in order to properly set the size and position of a solid image to be displayed. In case of fetching the 3-dimensional data (x, y, z) including the depth information (z) of the object shown in FIG. 3, by changing the coordinate position of the object data, the enlargement or reduction of time object or the conversion of distance can be executed. On the other hand, according to the embodiments of FIGS. 1 and 2 which don't have any 3-dimensional data of the object, the size or position of a solid image is changed from the 2-dimensional image by the following method.

Figure 8:
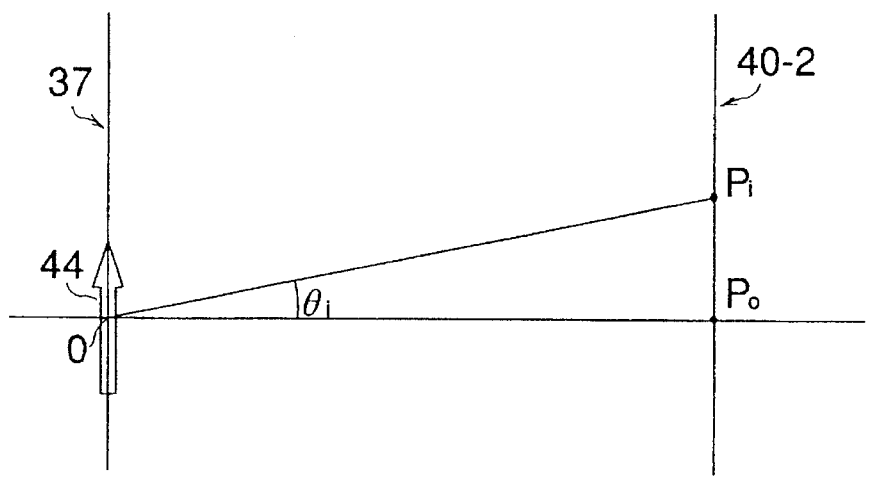
FIG. 8 is an explanatory diagram when an image is enlarged twice as large as FIG. 7.

FIG. 7 shows the relation between a display surface 37 to display an image and an image input surface 40-1 to input an image. FIG. 8 shows the relation between the display surface 37 to display an image and a hologram forming surface 40-2 to express a phase distribution. The image input surface 40-1 and the hologram forming surface 40-2 are set to the same plane. In FIG. 7, when an origin O is decided in a space in which an object 42 exists, a corresponding position P of the origin O exists on the image input surface 40-1. The object 42 on the display surface 37 is now shown by an arrow for simplicity of explanation. In the case where 2-dimensional images of the object 42 when it is seen from a point $p_0$ at which the origin O on the image input surface 40-1 is set to the center of a visual field and from a point $p_i$ different from the point $p_0$ are fetched at the point $p_i$, the origin is located at the position which is deviated from the center by only an angle $\theta_i$. Reference numerals 35-1 and 35-2 denote image pickup surfaces of the cameras. In case of enlarging the image, as shown in FIG. 8, it is enlarged as shown in an enlarged image 44 while setting the origin O into a center and a phase is calculated on the basis of the enlarged image 44. FIG. 8 shows the enlarged image 44 which is obtained by enlarging the image 42 to a double size. In this case, since the angle $\theta_i$ when the enlarged image 44 is seen from the points $p_0$ and $p_i$ is not changed, no contradiction occurs in the parallax of the image. On the other hand, by moving the position of the object 42 in parallel in the depth direction, it is possible to perform the enlargement or reduction with respect to the necessary object as a target. By enlarging, reducing, or moving the 2-dimensional image as mentioned above, the size and position of a solid image to be expressed can be freely changed.

Figure 9:
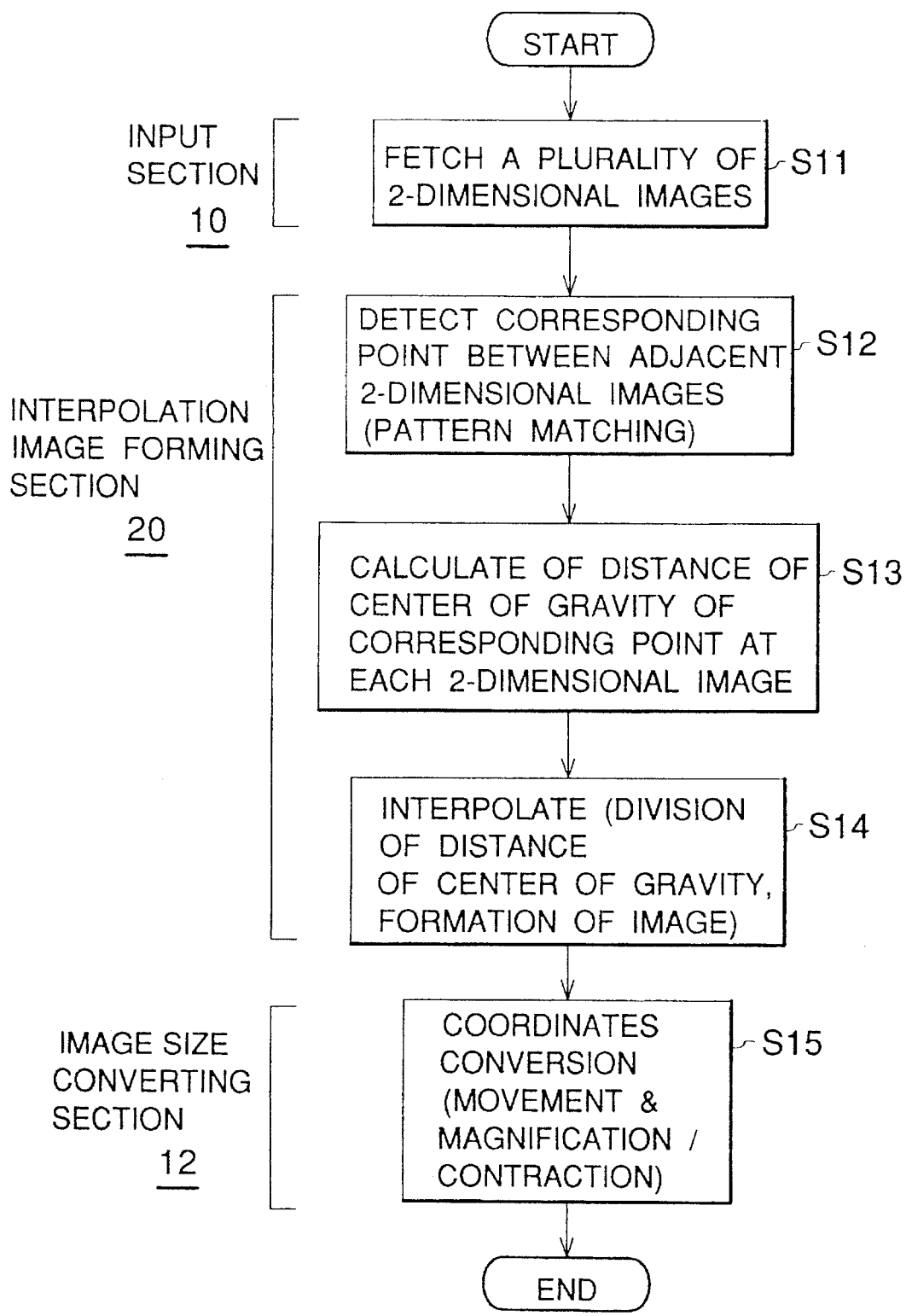
FIG. 9 is a flowchart showing the formation of an image by an interpolating calculation according to the invention.

FIG. 9 shows a procedure for image interpolating processes by the interpolation image forming section 20 in FIG. 2. First, in step S11, a plurality of 2-dimensional images are fetched. The number of images which are fetched in this case is set to a value smaller than the number of images necessary for the phase calculation. In step S12, the corresponding point on the object is detected between the neighboring 2-dimensional images. For example, a pattern matching is executed between the neighboring 2-dimensional images. The center of a predetermined region in which they are most similar is detected as a corresponding point. In step S13, a distance of the center of gravity from the corresponding point of the neighboring 2-dimensional images is calculated. In step S14, an interpolating calculation is executed. In the interpolating calculation, the distance of the center of gravity calculated in step S13 is divided and a 2-dimensional image is produced after completion of the interpolation at each of the divided points. Images of the number necessary for the phase calculation are produced by such image interpolation. In step S15, the coordinates conversion such as enlargement, reduction, movement, or the like is executed as necessary. On the basis of the 2-dimensional images of the object which were actually photographed, new 2-dimensional images are formed by the interpolation. The 2-dimensional images of the number necessary for the phase calculation can be produced. The number of cameras can thus be reduced.

Figure 10:
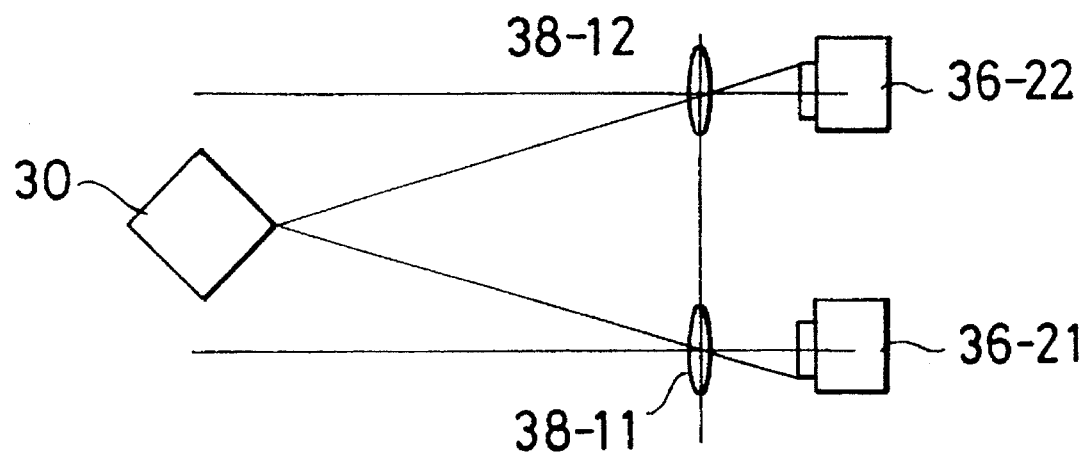
FIG. 10 is a plan view of a camera arrangement of the invention.
Figure 11:
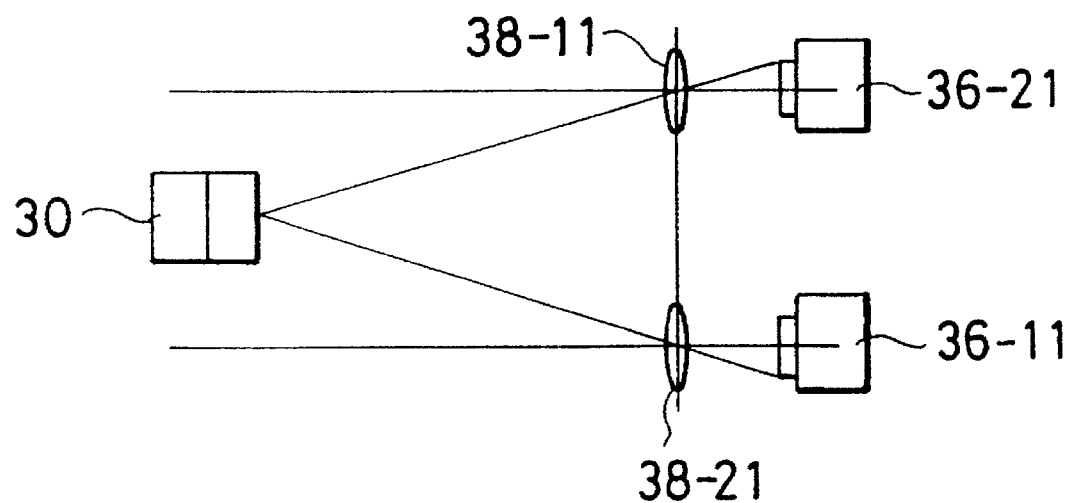
FIG. 11 is a side elevational view of a camera arrangement of the invention.
Figure 12:
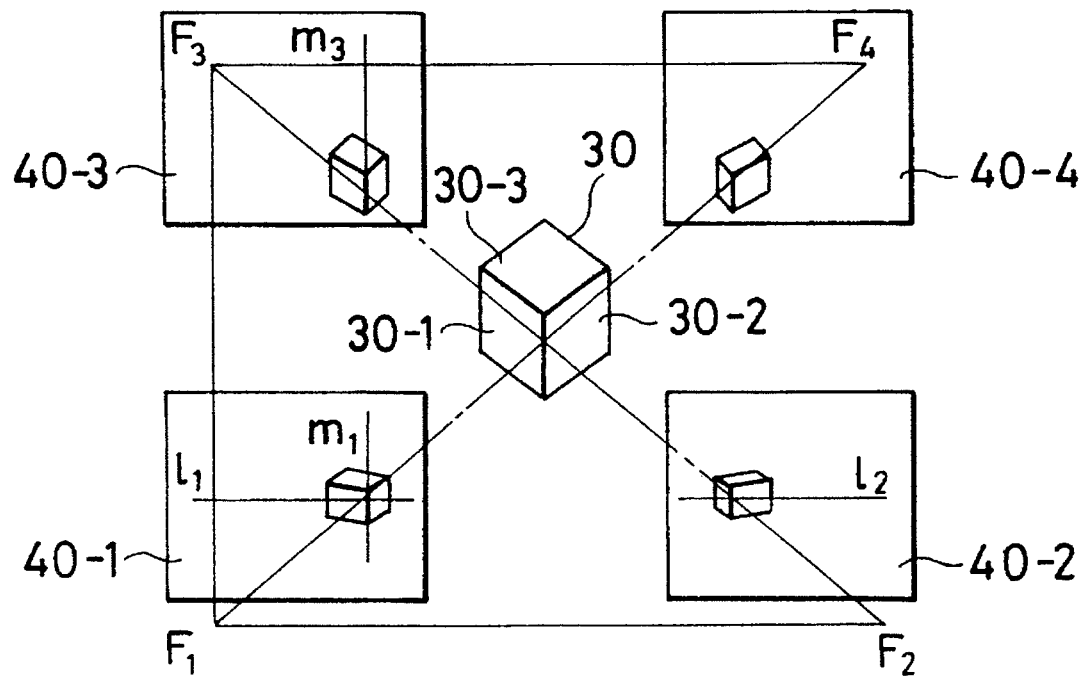
FIG. 12 is an explanatory diagram showing images photographed by four cameras.

FIG. 10 is a plan view of a camera arrangement for interpolating images from the 2-dimensional images which were photographed by four cameras. FIG. 11 shows a side elevational view. The cameras 36-11 to 36-22 are arranged so that optical axes of the lenses 38-21 to 38-12 are set to be parallel. FIG. 12 shows images 40-1 to 40-4 of the object 30 which were photographed by four cameras. The surfaces of the object 30 are now indicated by 30-1, 30-2, and 30-3.

Figure 13:
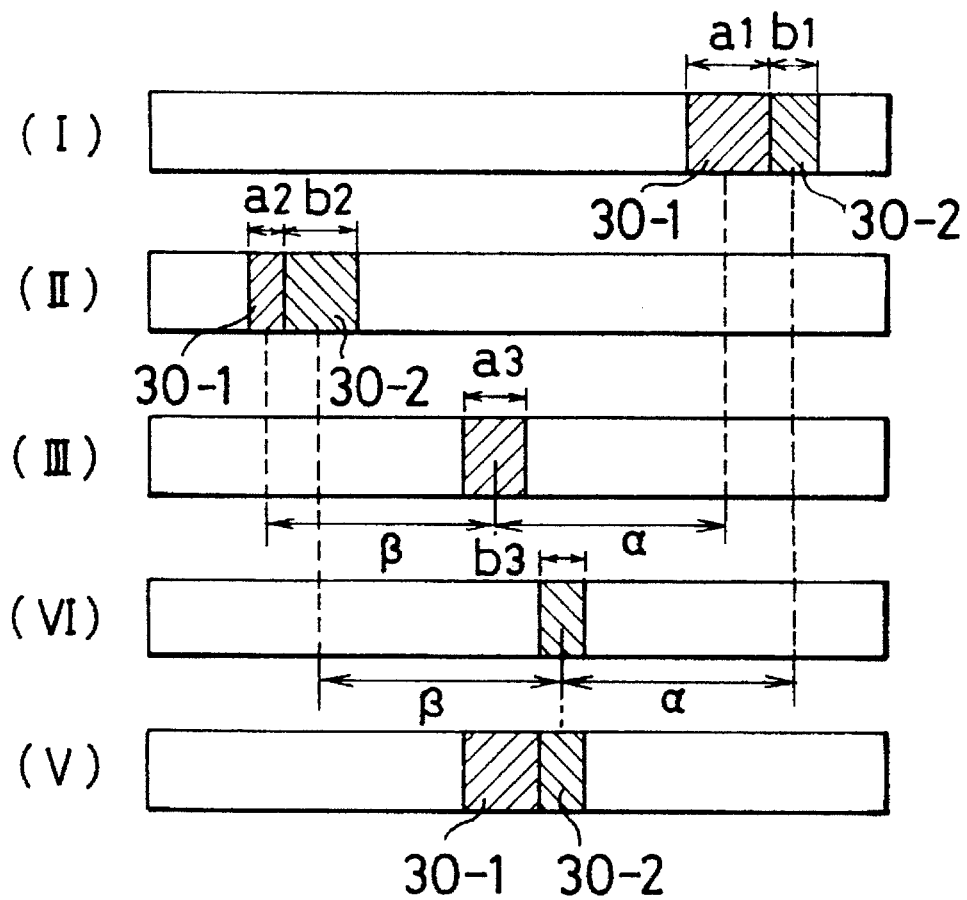
FIG. 13 is an explanatory diagram showing the image interpolation in the horizontal direction according to the invention.

FIG. 13 is a diagram for explaining the image interpolation with respect to the images 40-1 and 40-2 in the horizontal direction in FIG. 12. In this case, a corresponding point, when the object 30 is photographed by the two cameras 36-11 and 36-12 arranged at the same height, is obtained. A portion between them is divided at a ratio of $\beta:\alpha$ and the interpolated 2-dimensional image is produced, namely, processed by the following procedure.

I. Distances $a_1$ and $b_1$ of the surfaces 30-1 and 30-2 of the object are respectively obtained on the image 40-1.

II. Distances $a_2$ and $b_2$ of the surfaces 30-1 and 30-2 of the object are respectively obtained on the image 40-2.

III. A distance between the center of gravity of the distance $a_1$ of the surface 30-1 of the object on the image 40-1 in the above step II and the center of gravity of the distance $a_2$ of the surface 30-1 of the object on the image 40-2 is obtained. The distance is divided at a ratio of $\beta:\alpha$ to be interpolated. The value in which the image was interpolated at the divided position; namely, $$a_3 = a_1 \times \{\beta/(\alpha+\beta)\} + a_2 \times \{\alpha/(\alpha+\beta)\}$$

is obtained.

IV. In a manner similar to the above step III, a distance between the center of gravity of the distance $b_1$ of the surface 30-2 of the object on the image 40-1 of the above step I and the center of gravity of the distance $b_2$ of the surface 30-2 of the object on the image 40-2 is obtained. The distance is divided at the ratio of $\beta:\alpha$ to be interpolated and the value in which the image was interpolated at the divided position; namely, $$b_3 = b_1 \times \{\beta/(\alpha+\beta)\} + b_2 \times \{\alpha/(\alpha+\beta)\}$$

is obtained.

V. The images obtained in the above steps III and IV are synthesized, thereby producing a 2-dimensional image after completion of the interpolation to be derived.

Figure 14:
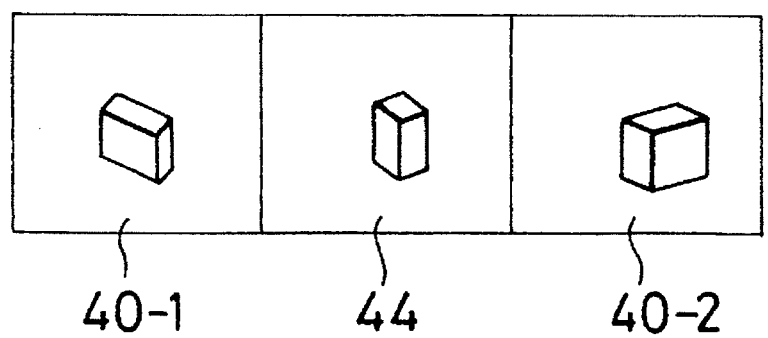
FIG. 14 is an explanatory diagram of the images formed by the interpolating processes in FIG. 13.

FIG. 14 shows the interpolated image 44 produced from the two images 40-1 and 40-2 which are neighboring in the horizontal direction. In this manner, a new interpolated 2-dimensional image can be produced from two neighboring images in the horizontal direction.

Figure 15:
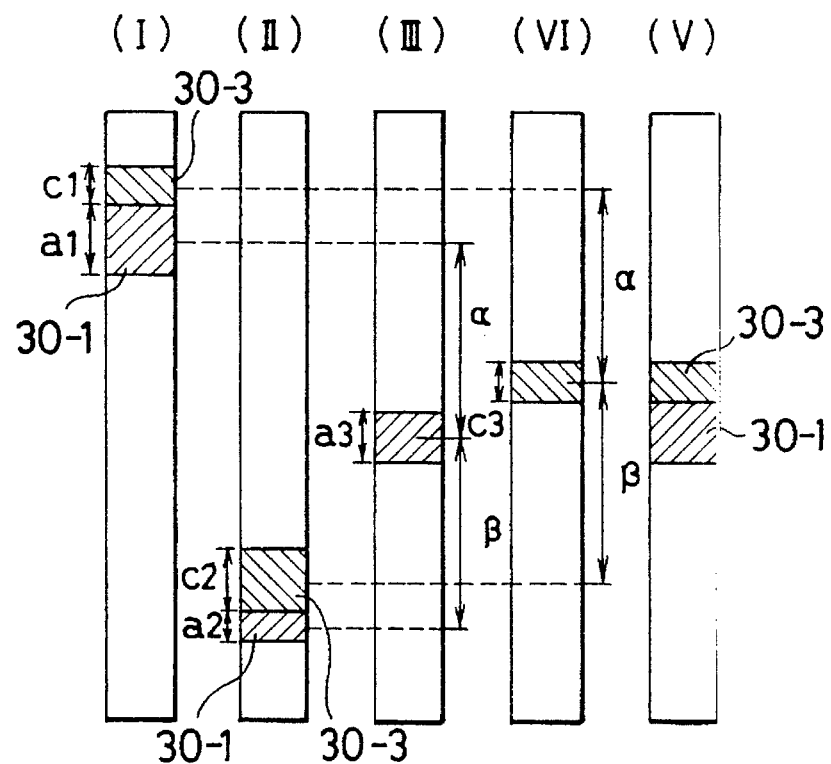
FIG. 15 is an explanatory diagram showing the image interpolation in the vertical direction according to the invention.

FIG. 15 is a diagram for explaining the image interpolation with respect to the images 40-1 and 40-3 in the vertical direction in FIG. 12. In this case, a corresponding point, when the object 30 is photographed by two cameras 36-11 and 36-21 arranged at the positions in the vertical direction, is obtained. A portion between them is divided at the ratio of β:α and the interpolated 2-dimensional image is produced, namely, processed by the following procedure.

I. Distances $a_1$ and $c_1$ of the surfaces 30-1 and 30-3 of the object are respectively obtained on the image 40-1.

II. Distances $a_2$ and $c_2$ of the surfaces 30-1 and 30-3 of the object are respectively obtained on the image 40-3.

III. A distance between the center of gravity of the distance $a_1$ of the surface 30-1 on the image 40-1 in the above step I and the center of gravity of the distance $a_2$ of the surface 30-1 of the object on the image 40-3 is obtained. The distance is divided by the ratio of β:α to be interpolated and the value in which the image was interpolated at the divided position, namely, $$a_3 = a_1 \times \{\beta/(\alpha+\beta)\} + a_2 \times \{\alpha/(\alpha+\beta)\}$$

is obtained.

IV. In a manner similar to the above step III, a distance between the center of gravity of the distance $c_1$ of the surface 30-3 of the object on the image 40-1 in the above step I and the center of gravity of the distance $c_2$ of the surface 30-3 of the object oil the image 40-3 is obtained. The distance is divided by the ratio of β:α to be interpolated and the value in which the image was interpolated at the divided position; namely, $$c_3 = c_1 \times \{\beta/(\alpha+\beta)\} + c_2 \times \{\alpha/(\alpha+\beta)\}$$

is obtained.

V. The images interpolated by the above steps III and IV are synthesized, thereby forming a 2-dimensional image after completion of the interpolation to be obtained.

Figure 16:
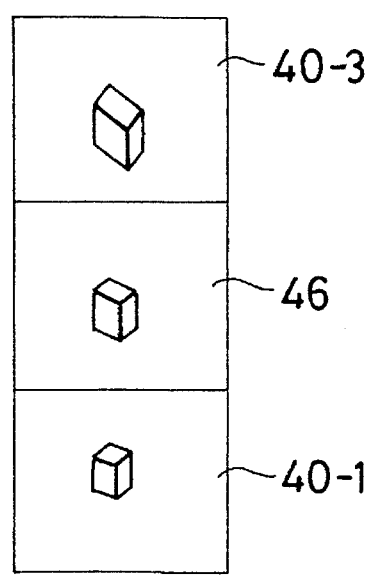
FIG. 16 is an explanatory diagram of the images formed by interpolating processes in FIG. 15.

FIG. 16 shows an interpolated image 46 produced from two images 40-1 and 40-3 which are neighboring in the vertical direction. In this manner, a new interpolated 2-dimensional image can be produced from two neighboring images in the vertical direction.

Figure 17:
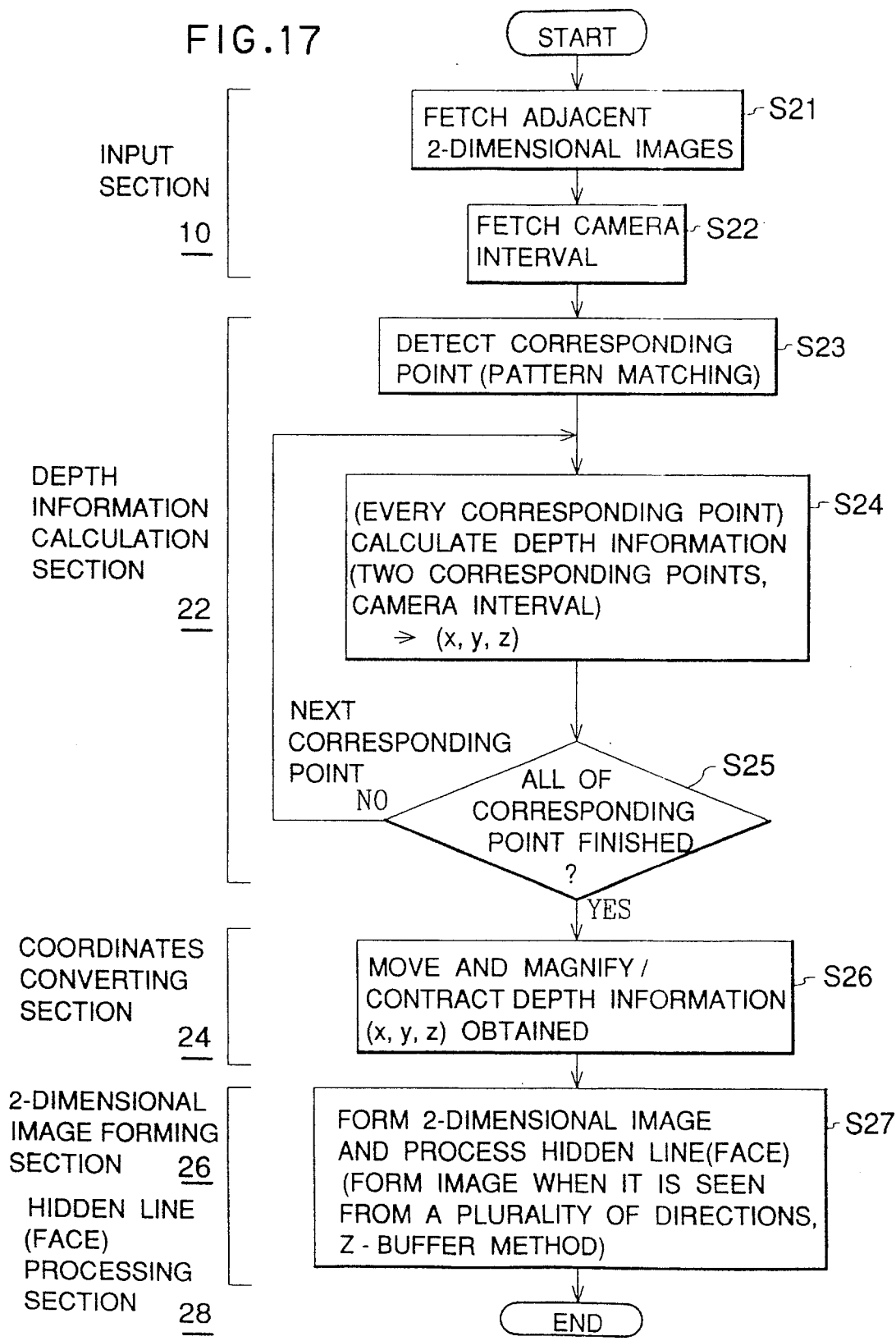
FIG. 17 is a flowchart showing inputting processes of depth information according to the invention.

FIG. 17 shows the details of image inputting processes by the depth information calculating section 22, coordinates converting section 24, 2-dimensional image forming section 26, and hidden image processing section 28 in FIG. 3. First, the input section 10 fetches the neighboring 2-dimensional images in step S21. An interval between the cameras is fetched in step S22. The depth information calculating section 22 detects a corresponding point in step S23. A pattern matching is executed with respect to the adjacent 2-dimensional images fetched in step S21, thereby detecting the corresponding point. In step S24, the depth information (z) is calculated every corresponding point. 3-dimensional coordinate values (x, y, and z) are calculated on the basis of the coordinates (x, y) of the corresponding point of the adjacent 2-dimensional images and the camera interval. In step S25, a check is made to see if the processes for all of the corresponding points have been finished or not. If NO, the process in step S24 is repeated. If YES, step S26 follows. In step S26, the 2-dimensional image forming section 26 executes the reduction, enlargement, or movement of the 3-dimensional information (x, y, z), thereby adjusting the size and position of the solid image. On the basis of the 3-dimensional information of the object produced in step S26, the hidden image processing section 28 produces the 2-dimensional images of the number necessary for the phase calculation when they are seen from a plurality of directions and executes hidden image processes by a Z buffer method. The 3-dimensional information is calculated on the basis of the adjacent 2-dimensional images as mentioned above. The 2-dimensional images of the number necessary for the phase calculation are produced from the 3-dimensional information.

Figure 18:
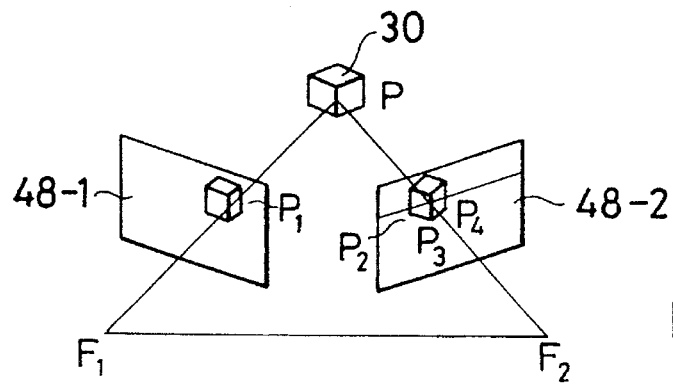
FIG. 18 is an explanatory diagram of the triangulation to obtain depth information of the invention.

FIG. 18 shows the principle of the triangulation which is used in the depth information calculating section 22 provided in the embodiment of FIG. 3. It is now assumed that positions $F_1$ and $F_2$, directions, and lens optical axes of two cameras have already been known, as shown in FIG. 18. A point P on the object 30 is projected to a point $p_1$ on a picture plane 48-1 and to a point $p_3$ on a picture plane 48-2. When the positions of the points $p_1$ and $p_3$ on the picture planes 48-1 and 48-2 are known, the 3-dimensional position (x, y, z) of the point P can be known as a cross point of straight lines $F_1 p_1$ and $F_2 p_3$ by the principle of the triangulation.

Figure 19:
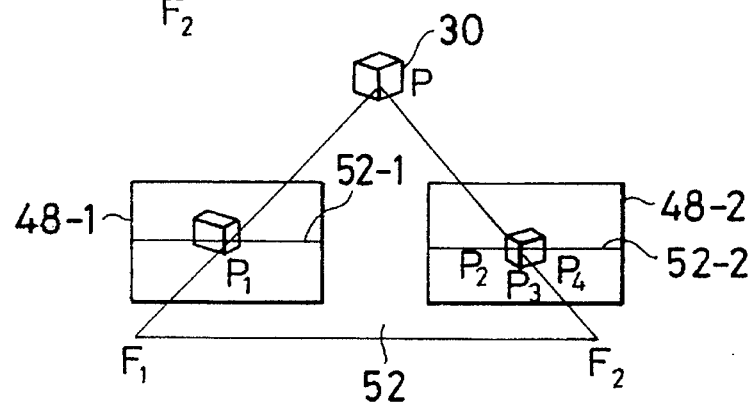
FIG. 19 is an explanatory diagram of the corresponding points on objects in two images.

The corresponding point of two images is obtained by a method as shown in FIG. 19. In case of the observation using two eyes, the corresponding points certainly exist on straight lines 52-1 and 52-2 which are obtained as cross lines of a sight line surface 52 which is decided by three points $F_1$, $F_2$, and $p_1$ and the picture planes 48-1 and 48-2. Therefore, it is sufficient to search the corresponding point of the point $p_1$ and to search on only the straight line 52-2 of the picture plane 48-2. Particularly, as shown in FIG. 19, in the case where the optical axes of two cameras are in parallel and are perpendicular to a base line $F_1 F_2$ connecting the centers of the lenses of two cameras and the base line $F_1 F_2$ is in parallel with the horizontal axis (X axis) of the picture plane, the sight line image coincides with the scanning line of the camera, so that the corresponding point can be easily searched.

A procedure to form 3-dimensional data will now be explained with reference to FIG. 19. First, various kinds of image processes such as region division, edge extraction, line detection, and the like are executed. The corresponding point is obtained by a correlation under a restricting condition such that all of the objects which are moved onto the straight line 52-1 in the picture plane 48-1 are also moved onto the straight line 52-2 in the picture plane 48-2. When similar singular points exist on the sight line image and the candidates of the corresponding points cannot be decided, a reliability is raised by using a corresponding process by using a feature collating method, a condensation and rarefaction method, and a general nature.

Figure 20:
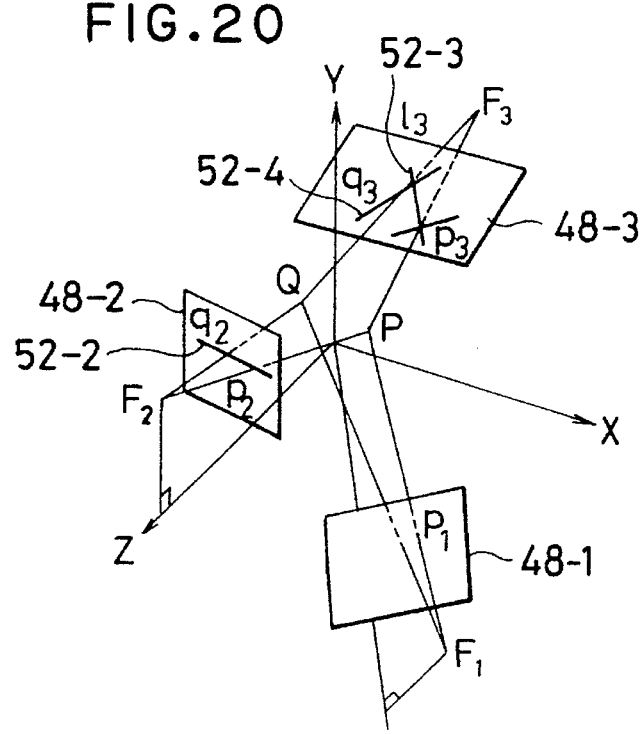
FIG. 20 is an explanatory diagram showing the measurement of depth information by the observation using three eyes.

As shown in FIG. 20, the reliability can be improved by a method of three-eye observing method whereby three cameras are used and a geometrical restriction which occurs due to this is used. In case of only the restricting conditions of two eyes, a point Q is also reflected as a point $q_2$ onto the straight line 52-2, two points $p_2$ and $q_2$ can be mentioned as candidates of the corresponding point of the point $p_1$, so that the corresponding point cannot be decided. However, when three cameras are used, even in the picture plane 48-3, since there is a limitation such that the point $p_3$ is set to a cross point of straight lines 52-3 and 52-4, the point $p_2$ can be determined as a corresponding point. After the corresponding point was obtained as mentioned above, the 3-dimensional information (x, y, z) is obtained by the principle of triangulation. A 2-dimensional image which is seen from an arbitrary direction can be easily produced from the finally obtained 3-dimensional information.

Figure 21:
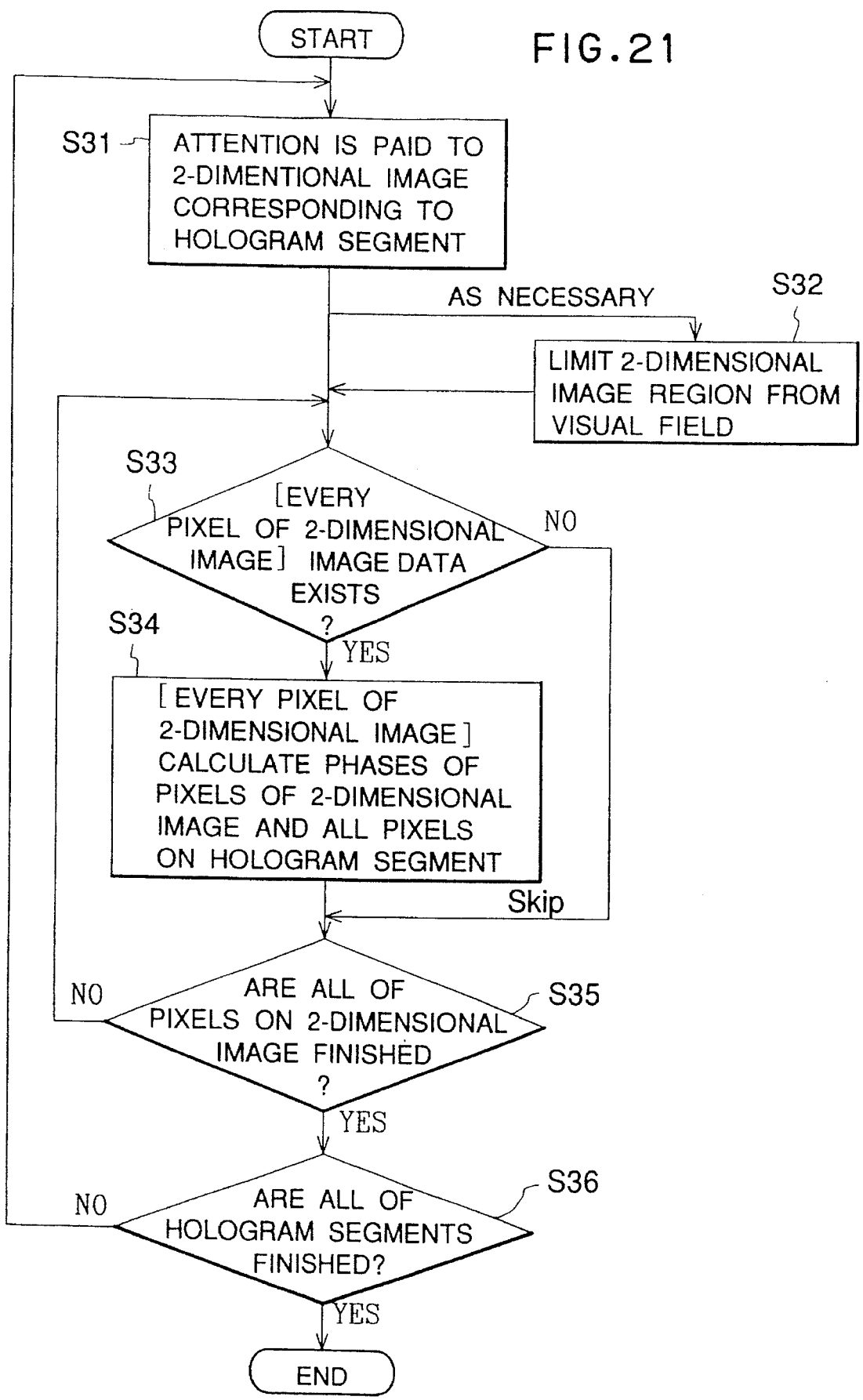
FIG. 21 is a flowchart showing phase calculating processes of the invention in which a Fresnel hologram is used as a target.

FIG. 21 shows the details of the phase calculating processes by the phase calculating section 14 provided in each embodiment of FIGS. 1, 2, and 3. First, in step S31, attention is paid to a 2-dimensional image corresponding to an arbitrary hologram segment as one unit in the phase calculation on the hologram forming surface. In step S32, a region of the 2-dimensional image as a target of the phase calculation is restricted on the basis of a view region as necessary, thereby reducing a phase calculation amount. In step S33, the presence or absence of the effective image data is discriminated every pixel of the 2-dimensional image. For example, with regard to the luminance, the presence or absence of the effective data exceeding 0 is discriminated. By executing the phase calculation with respect to only the portion in which the image data exists, the calculation amount is reduced. When the pixel of the 2-dimensional image is the effective data, in step S34, the phase calculation is executed for all of the hologram segments on the hologram forming surface and every pixel of the 2-dimensional image. The processing routine advances to step S35. On the other hand, when there is not effective pixel data in step S33, the phase calculation in step S34 is skipped and step S35 follows. In step S35, a check is made to see if the processes of all of the pixels on the 2-dimensional image have been finished. If NO, steps S33 and S34 are repeated. If YES, step S36 follows. In step S36, a check is made to see if the processes of all of the hologram segments have been finished. If NO, the processing routine is returned to step S31 and the phase calculation of the next hologram segment is started. If YES, the processing routine is finished. As mentioned above, the phase calculations of all of the pixels on the 2-dimensional image and all of the hologram segments are repeated every hologram segment and a phase distribution which is necessary for a holographic stereogram is obtained.

Figure 22:
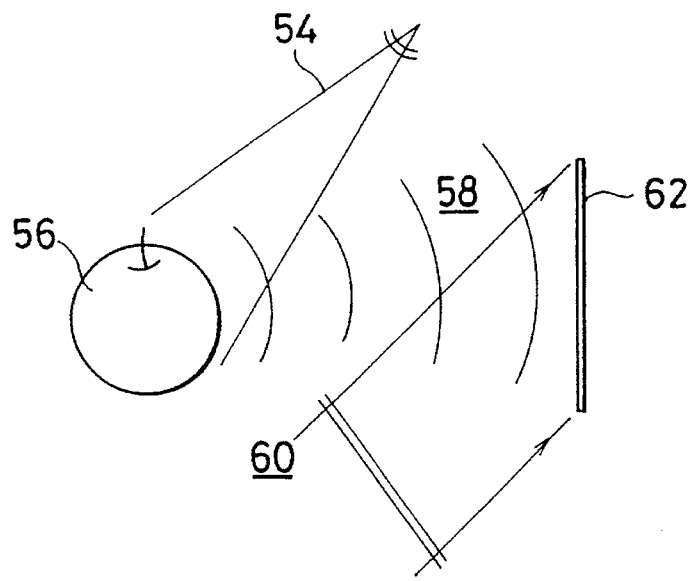
FIG. 22 is an explanatory diagram of an interference exposure for a hologram dry plate.

FIG. 22 shows a method of forming a hologram dry plate by an interference exposure of two wavelengths. First, one laser beam is divided into two beams. One laser beam 54 is irradiated to an object 56, so that a scattered object light 58 is obtained. A hologram dry plate 62 is obtained by an interference of two light fluxes of the object light 58 and a reference light 60 as another laser beam. Now, assuming that wave fronts of the reference light 60 and object light 58 are respectively set to $$R \cdot \exp(j\phi_r) \text{ and } O \cdot \exp(j\phi_o),$$

an exposing intensity $I_H$ of the hologram is as follows.

$$I_H = R^2 + O^2 + 2R \cdot O \cdot \cos(\phi_o - \phi_r) \quad (1)$$

Figure 23:
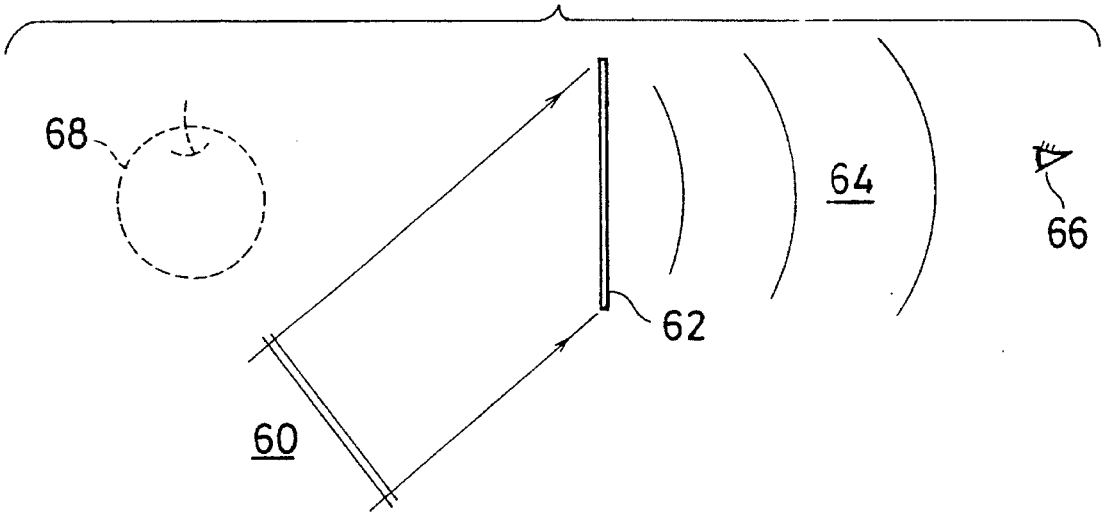
FIG. 23 is an explanatory diagram showing the reproduction of a solid image by the hologram dry plate formed in FIG. 22.

In case of an interference exposure to form the hologram dry plate 62, changes in amplitude and phase which are proportional to the exposing intensity $I_H$ are formed as a hologram of an interference fringe. To electronically form a hologram, a device such as a phase display which can display changes in amplitude and phase of the light is necessary. As shown in FIG. 23, the same wave front 60 as the reference light is inputted to the hologram dry plate 62, formed as mentioned above, and is reproduced. In the exposing intensity $I_H$ of the hologram, only the third term of the right side of the equation (1) contributes to the reproduction of the object light. Therefore, when considering the third term, a transmission light T from the hologram is as follows:

$$\begin{aligned} T &= I_H \cdot R \cdot \exp(j\phi_r) \quad (2)\\ &\propto 2 \cdot O \cdot \cos(\phi_o - \phi_r) \cdot \exp(j\phi_r)\\ &= O \cdot \exp(j\phi_o) + O \cdot \exp\{-j(\phi_o - 2\phi_r)\} \end{aligned}$$

The first term of the right side of the equation (2) denotes that the wave front from the object was reproduced, and the second term indicates a conjugate wave of the object light. From the above description, it will be understood that it is sufficient to perform only the following calculation as a phase calculation of the hologram:

$$2 \cdot O \cdot R \cdot \cos(\phi_o - \phi_r)$$

Figure 24:
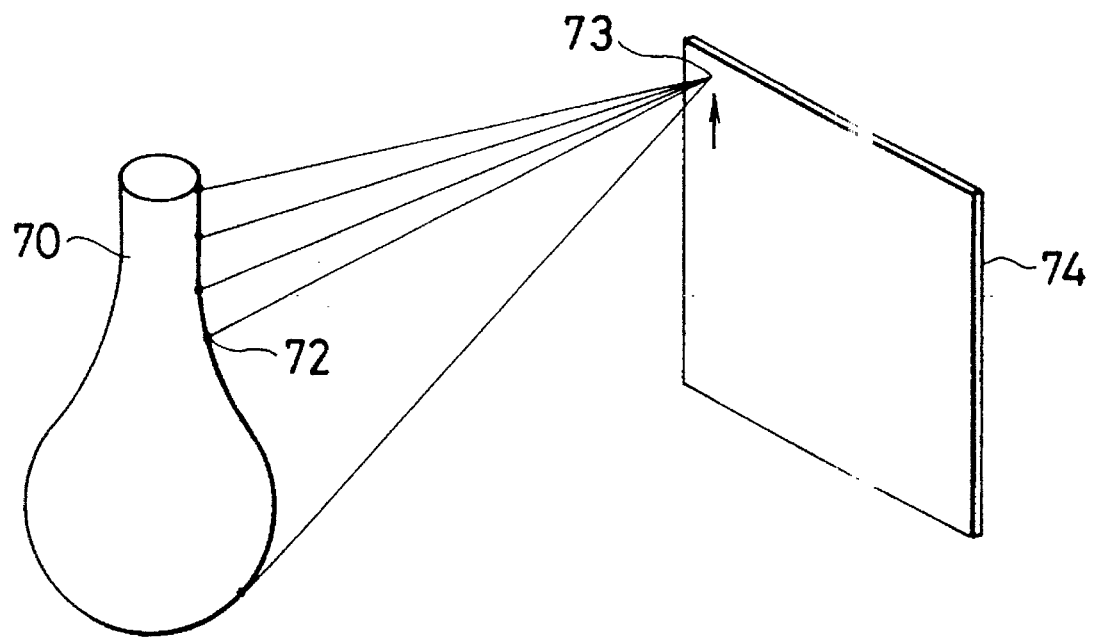
FIG. 24 is an explanatory diagram showing the phase calculation of the invention in which a Fresnel hologram is used as a target.

FIG. 24 shows the phase calculation in which a Fresnel hologram is used as a target. In case of the Fresnel hologram, when it is assumed that the reference light is a plane wave which perpendicularly enters a hologram 74, an amplitude component R can be ignored because there is no intensity change depending on the location. It is also possible to handle as $\phi=0$. Now, assuming that a luminance (scattering degree) of a certain sampling point 72 having coordinates $(x_i, y_i, z_i)$ on an object 70 is set to $I_i$, an exposing intensity of coordinates $(x_{h1}, y_{h2})$ on the hologram 74 is as follows:

$$I_H(x_{hi}, y_{hi}) = \Sigma_i \{I_i / r_{ih1h2} \cdot \cos(k \cdot r_{ih1h2})\} \quad (3)$$

$$r_{ih1h2} = \sqrt{(x_i - x_{h1})^2 + (y_i - y_{h2})^2 + z_i^2} \quad (4)$$

where, k denotes the number of waves of the laser beam.

In case of a Fresnel type hologram, since the light from the object 70 reaches the whole hologram 74, it is necessary to execute the calculations (3) and (4) for the whole region of the hologram 74.

Figure 25:
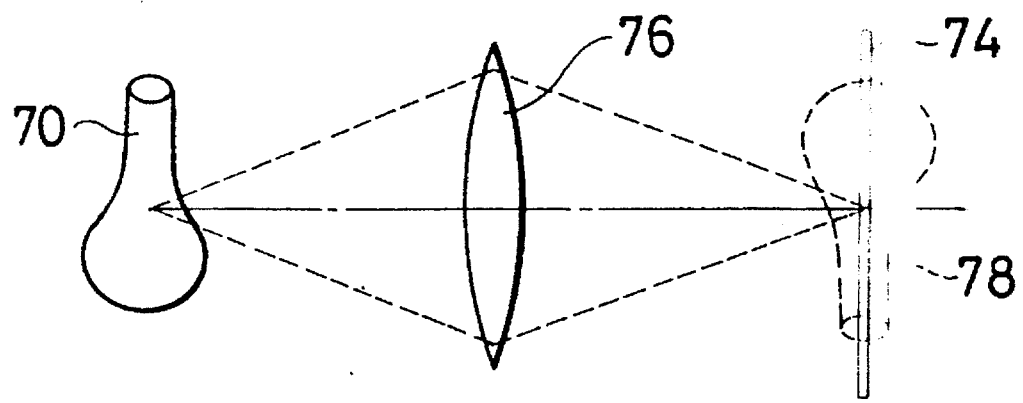
FIG. 25 is an explanatory diagram showing the phase calculation of the invention in which an image hologram is used as a target.
Figure 26:
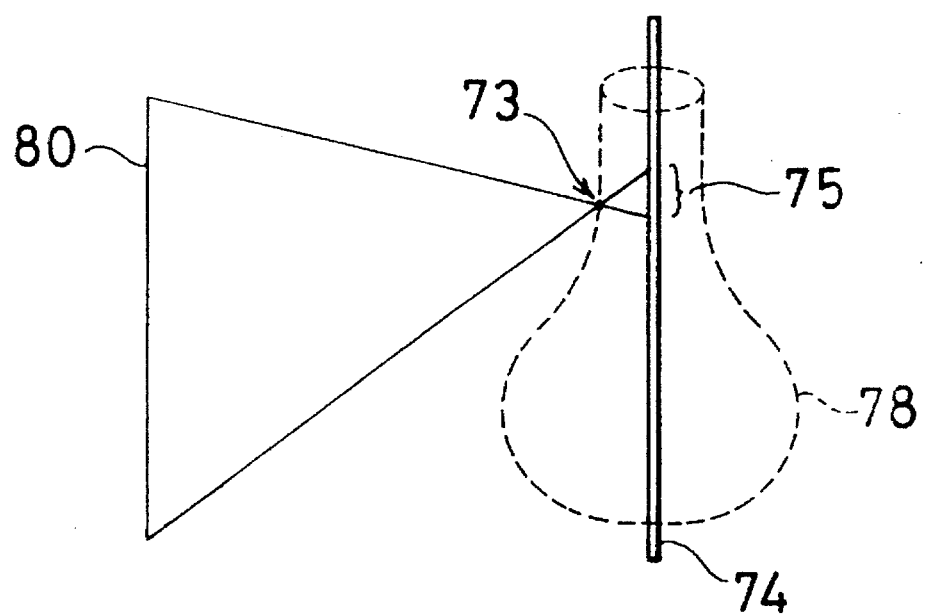
FIG. 26 is an explanatory diagram showing the relation between the image hologram and a virtual opening.

On the other hand, in case of an image hologram shown in FIG. 25, an image 78 of the object 70 formed on the hologram 74 by an image forming lens 76 is displayed as a solid image. Therefore, as shown in FIG. 26, since the light reaches only between a virtual opening 80 and a sampling point 73 of the object 70, the calculations of (3) and (4) are limited to a region 75. Further, an object to be recorded is a 3-dimensional object, although a hidden image process is needed to produce a solid model, a hidden image process is unnecessary in the phase calculation in case of a 2-dimensional image.

Figures 27, 28:
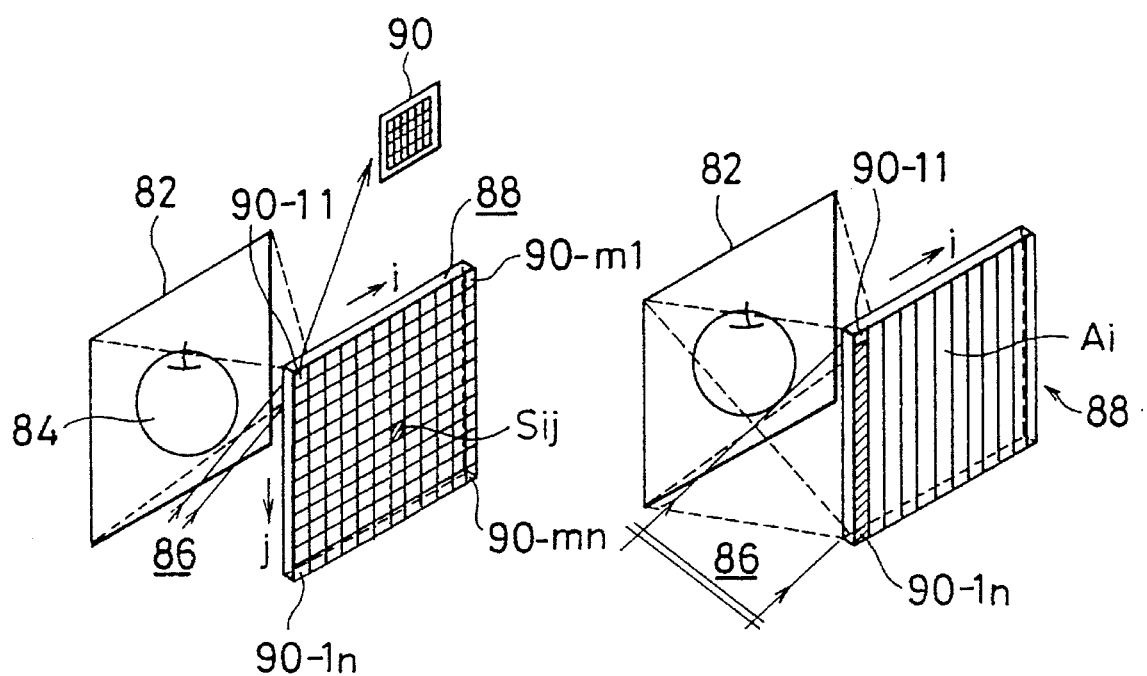
FIG. 27 is an explanatory diagram of the phase calculation of a hologram of the invention having parallaxes in the horizontal and vertical directions.
FIG. 28 is an explanatory diagram of the phase calculation of a hologram of the invention having a parallax in only the horizontal direction.

FIG. 27 shows a method of the phase calculation whereby a holographic stereogram having parallaxes in the vertical and horizontal directions is obtained from a 2-dimensional image. First, a holographic stereogram 88 is divided into m (in the horizontal direction i) × n (in the vertical direction j) hologram segments. Each segment corresponds to a pixel 90 as one unit to express the phase distribution. The segments are generally shown by $S_{ij}$ (i=1 to m, j=1 to n). To obtain a hologram having parallaxes in the horizontal and vertical directions, (m×n) 2-dimensional images 82 in which each position of the segments $S_{ij}$ is set to a visual point are prepared. The 2-dimensional images are indicated by $90_{11}$ to $90_{nm}$. For example, a phase distribution of the segment $S_{11}$ at the left upper corner is obtained by performing the calculations (3) and (4) for the corresponding 2-dimensional image $90_{11}$. The relations of the 2-dimensional images which are used in the phase calculation of the segments are as shown in the following table.

TABLE 1

| Segment | 2-dimensional image |
|---|---|
| $S_{11}$ | $90_{11}$ |
| $S_{12}$ | $90_{12}$ |
| . | . |
| . | . |
| $S_{mn}$ | $90_{nm}$ |

FIG. 28 shows the phase calculation of a holographic stereogram having a parallax in only the horizontal direction. Now, assuming that the dividing number of segments in the horizontal direction i in the holographic stereogram 88 is set to m, the stereogram can be divided into segment regions $A_1$ to $A_m$. In each of the segment regions $A_1$ to $A_m$, as shown in FIG. 27 n segments $S_{ij}$ are arranged in the vertical direction. As images $G_1$ to $G_m$ which were photographed while setting for the 2-dimensional images in this case, 2-dimensional the segment regions $A_1$ to $A_m$ to the camera positions are prepared. For example, with regard to the segment region $A_1$, a phase distribution is calculated every n segments $S_{11}$ to $S_{1n}$ arranged in the vertical direction from the equations (3) and (4) by using the 2-dimensional image $90_1$. The relations among the 2-dimensional images which are used in the phase calculation of the segment are as shown in the following table.

TABLE 2

| Segment region | Segment | 2-dimensional image |
|---|---|---|
| $A_1$ | $S_{11}$ | $90_1$ |
|  | $S_{12}$ | $90_1$ |
|  | . | . |
|  | . | . |
|  | . | . |
|  | $S_{1n}$ | $90_1$ |
| . | . | . |
| . | . | . |
| . | . | . |
| $A_m$ | $S_{m1}$ | $90_m$ |
|  | $S_{m2}$ | $90_m$ |
|  | . | . |
|  | . | . |
|  | . | . |
|  | $S_{mn}$ | $90_m$ |

Figure 29:
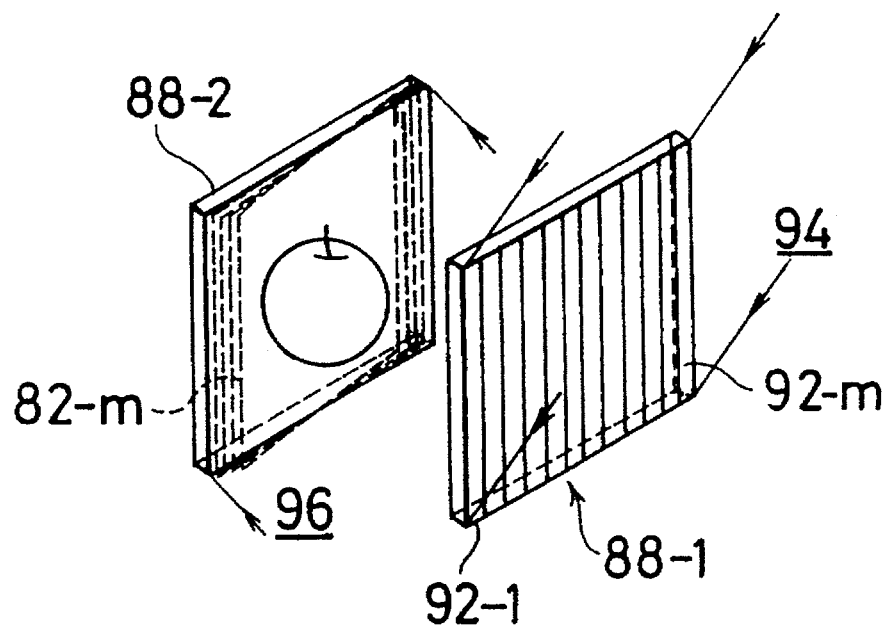
FIG. 29 is an explanatory diagram of a hologram in the case where optical axes of photographing cameras cross at one point with respect to FIG. 28.
Figure 30:
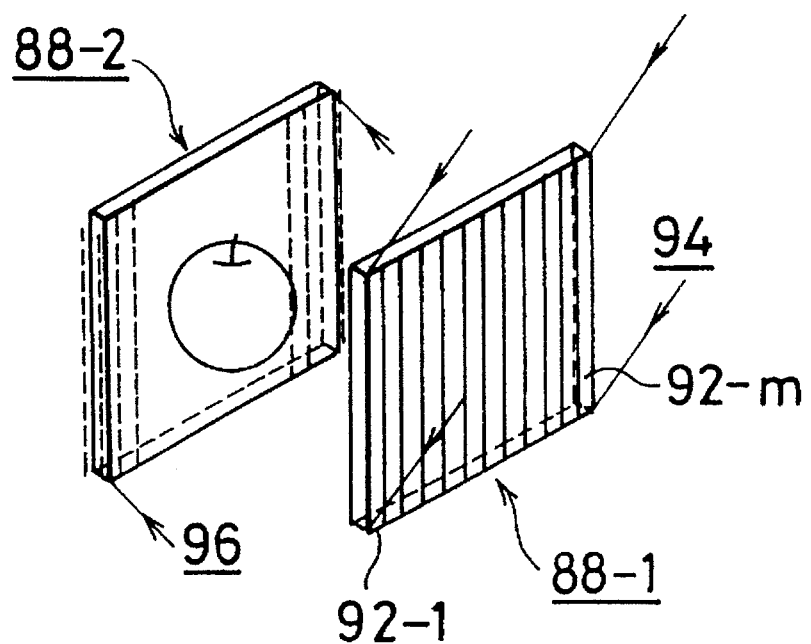
FIG. 30 is an explanatory diagram of a hologram in the case where the optical axes of the photographing cameras are parallel with respect to FIG. 28.

FIG. 29 shows the case of forming a hologram on the basis of the image which is reproduced frown the holographic stereogram shown in FIG. 28, namely, the case of forming an imaged holographic stereogram. By irradiating a reproduction light 94 to a holographic stereogram 88-1 formed in FIG. 28, a 2-dimensional image is recorded on an image holographic stereogram 88-2. In this instance, in the case where 2-dimensional images which are used to form the holographic stereogram 88-1 are photographed by arranging the cameras so that the optical axes cross at one point of the object, the 2-dimensional images are recorded on the image holographic stereogram 88-2 having an angle distribution for the whole hologram. FIG. 30 shows the case where 2-dimensional images which are used in the formation of the holographic stereogram 88-1 were photographed by arranging the cameras so that the optical axes are in parallel. The image holographic stereogram 88-2 in which the 2-dimensional images have a positional deviation in the horizontal direction is derived.

Figure 31:
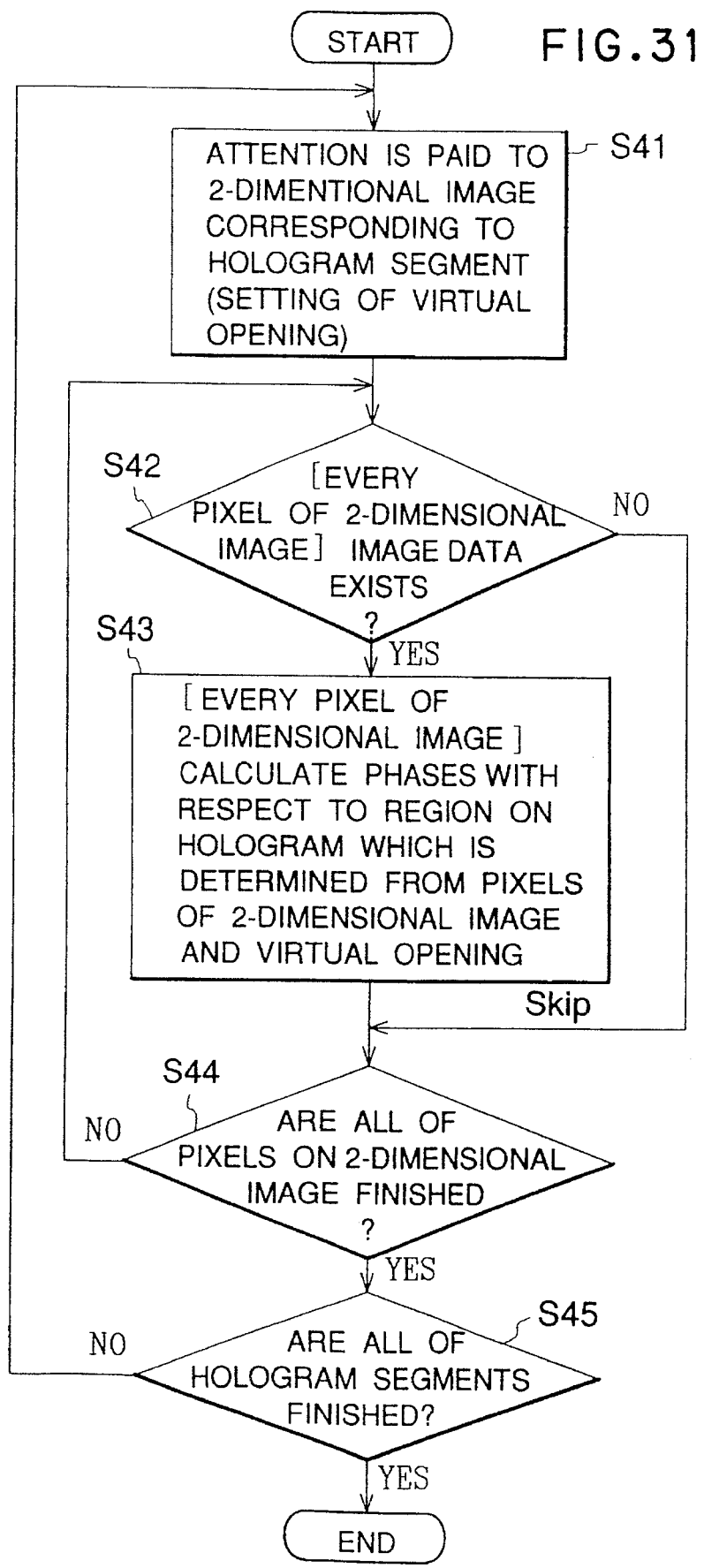
FIG. 31 is a flowchart showing the phase calculation of the invention in which an image hologram is used as a target.
Figure 32:
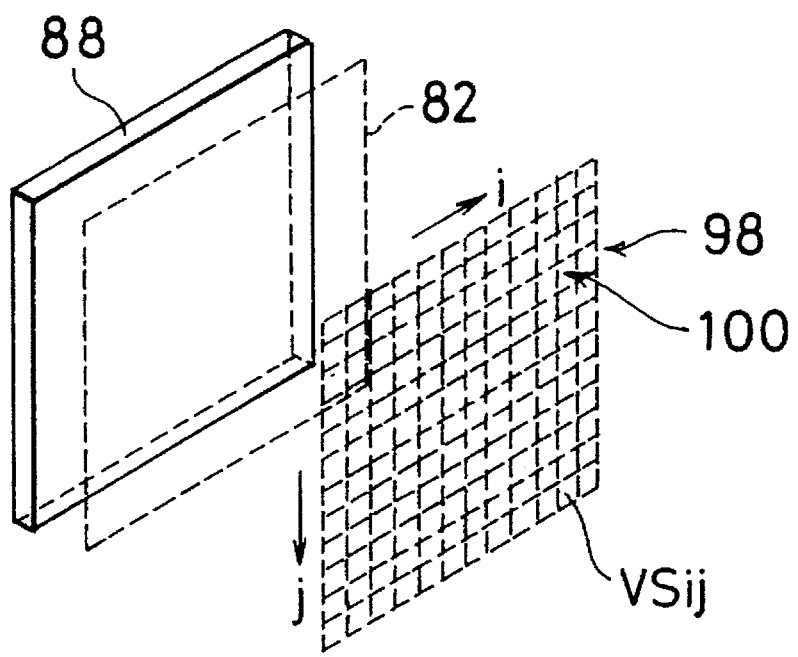
FIG. 32 is an explanatory diagram of a virtual opening in the please calculation of the image hologram.
Figure 33:
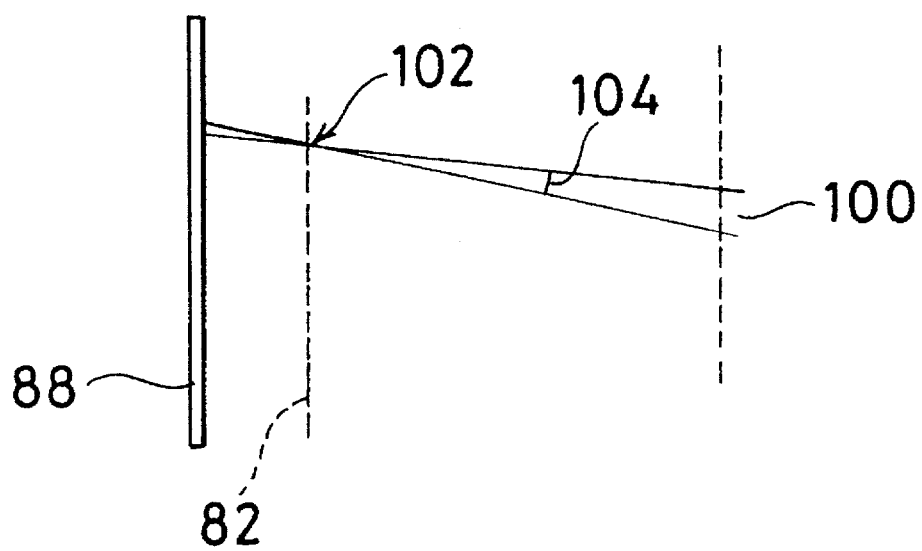
FIG. 33 is a side elevational view of FIG. 32.

FIG. 31 shows the details of the phase calculation of the invention to obtain a phase distribution of an image hologram. First, in step S41, attention is paid to a 2-dimensional image corresponding to an arbitrary hologram segment and a virtual opening is set in the following manner. First, as shown in FIG. 32, a virtual holographic stereogram 98 is set for the hologram 88 and the 2-dimensional images 82. The virtual holographic stereogram 98 is constructed by dividing (m×n) virtual hologram segments. Those virtual hologram segments are used as virtual openings 100 and assume virtual hologram segments $VS_{ij}$. The 2-dimensional images 82 corresponding to the virtual openings 100 are arranged near the hologram 88 which is subjected to the phase calculation. A light beam which arrives at the hologram 88 from the 2-dimensional image 82 is a light beam which passes through the virtual openings 100. Namely, as shown in the side elevational view of FIG. 33, a light beam which arrives at the hologram 88 from a point 102 of the 2-dimensional image 82 is a light beam having an extent 104 of the light flux which passes through the virtual opening 100 while setting the point 102 into a cross point. Therefore, the extent 104 of the light flux by the virtual opening 100 is calculated for every for pixel of the 2-dimensional image 82 to be recorded and the phase calculation is performed to only the region on the hologram 88 at which the light flux arrives.

Referring again to FIG. 31, in the next step S42, the presence or absence of the effective image data is determined for every pixel of the 2-dimensional image. If there is effective image data, in step S43, the phase calculation is executed for every pixel of the 2-dimensional image with respect to the region on the hologram that is determined from the pixels of the 2-dimensional image and the virtual openings. The processing routine advances to step S44. On the other hand, when no effective image data exists, the phase calculation in step S43 is skipped and step S44 follows. In step S44, a check is made to see if all of the processes of the pixels on the 2-dimensional image have been finished. If NO, the processing routine is returned to step S42 and similar processes are repeated with respect to the remaining pixels. After completion of the processes of all of the pixels, step S45 follows. In step S45, a check is made to see if the phase calculations for all of the virtual hologram segments have been finished. If NO, the processing routine is returned to step S41. If YES, the above series of processes are finished.

Figure 34:
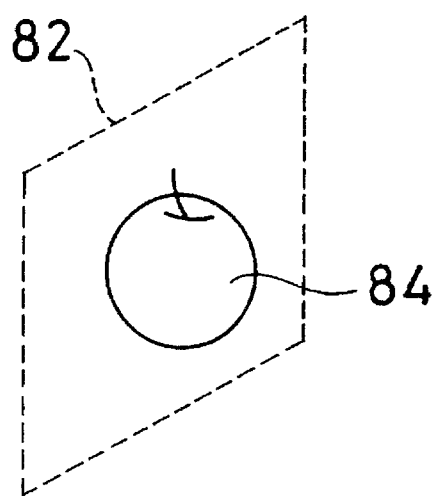
FIG. 34 is an explanatory diagram showing the reduction of a phase calculation amount according to the invention.

FIG. 34 shows a method of reducing an amount phase calculations of the invention. In this case, the phase calculation is executed with respect to only a region in which the image (effective pixel data) of an object 84 on the 2-dimensional image 82. Thus, there is no need to perform the phase calculations about the pixels for other than the region of the object 84. The number of pixels of the 2-dimensional image which are subjected to the phase calculation can be fairly reduced. The phase calculation can thus be executed at a high speed.

Figure 35:
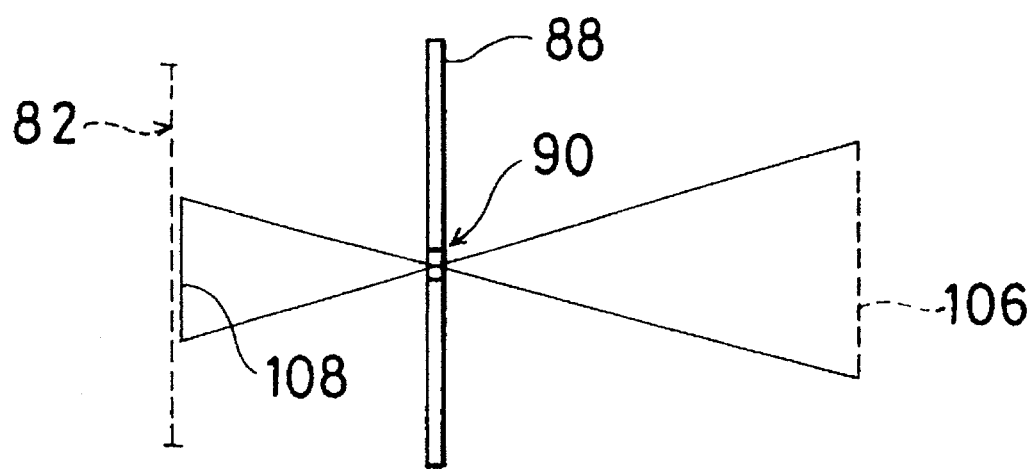
FIG. 35 is an explanatory diagram showing another example of the reduction of a phase calculation amount according to the invention.

FIG. 35 shows another method of reducing the amount of phase calculations of the invention. In the case where the phase distribution of a certain hologram segment 90 in the hologram 88 is calculated from the 2-dimensional images 82, the phase calculation is executed with respect to only the pixels in a region 108 that is determined by a view region 106 in which the observer can see a solid body. Due to this, the number of pixels that are the target of the phase calculation on the 2-dimensional image 82 can be reduced.

Figure 36:
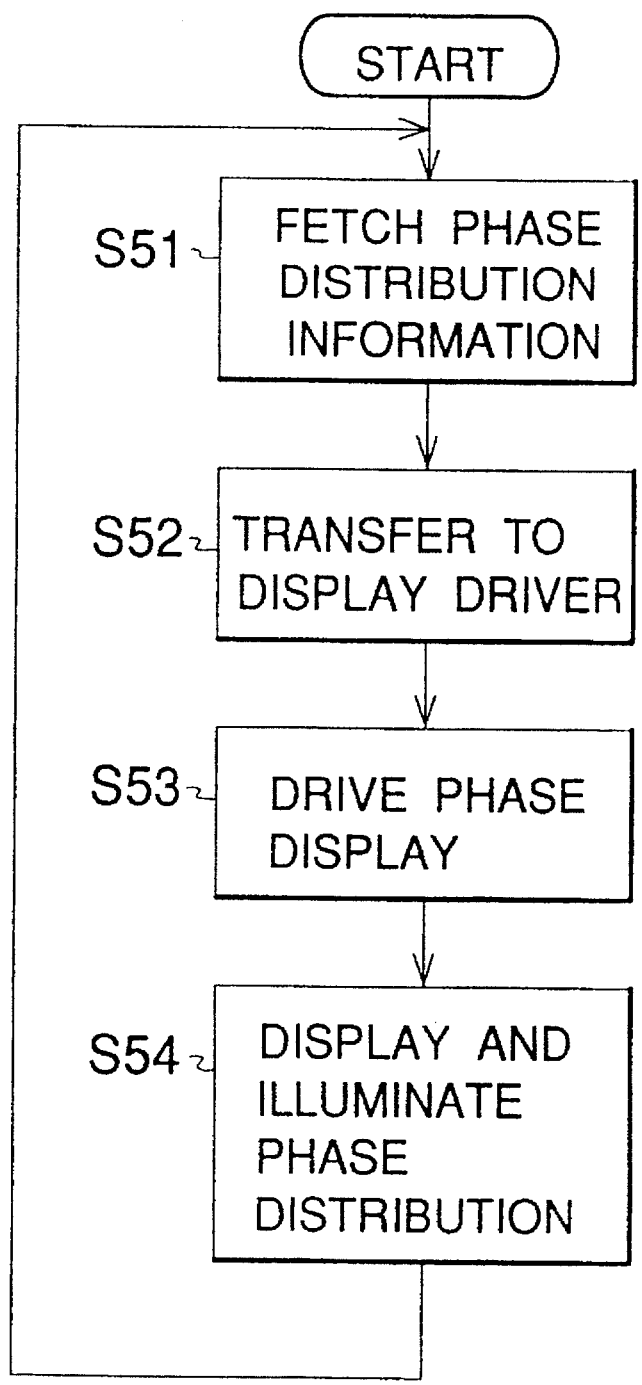
FIG. 36 is a flowchart showing phase expressing processes of the invention.

The display of a solid image by the phase expressing section 16 and the illuminating section 18 shown in the embodiment of FIGS. 1 to 3 will now be described in detail. FIG. 36 shows a procedure for display processes according to the invention. First, in step S51, the phase distribution information calculated from the 2-dimensional images by the phase calculating section 14 is fetched. In step S52, the phase distribution information is transferred to a display driver. In step S53, the phase display is driven by the display driver. In step S54, the phase distribution is displayed by the phase distribution display and the reproduction light is irradiated. The user observes the reproduced solid image by the phase modulation of the irradiated reproduction light. In a manner similar to the above processes, the processes are repeated with regard to the next picture plane hereinbelow.

Figure 37:
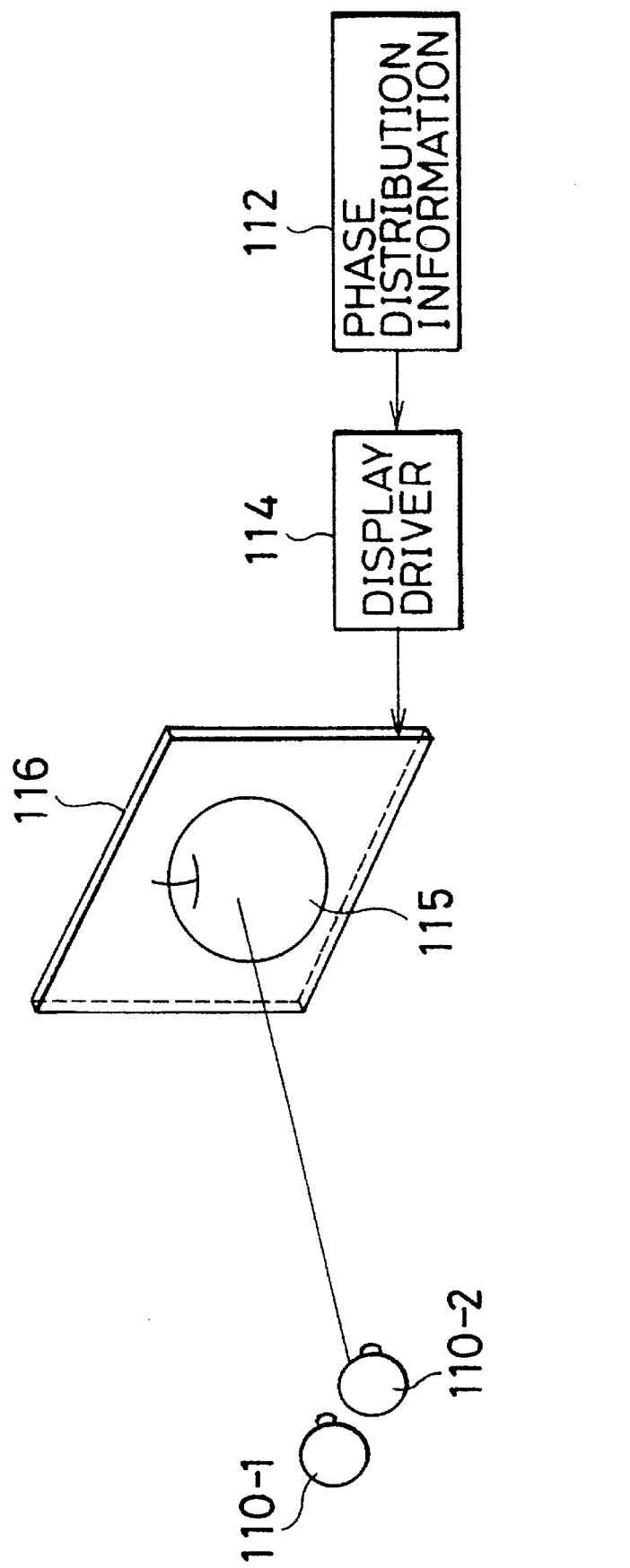
FIG. 37 is an explanatory diagram showing a fundamental construction of a reproducing system of the invention.

FIG. 37 shows a fundamental construction of a reproducing system of the invention. On the basis of phase distribution information 112, a display driver 114 drives a phase display 116 which is constructed by two-dimensionally arranging a number of micropixels, each for displaying a phase value. The phase display 116 modulates the phase of reproduction light, thereby enabling a solid image to be observed by eyes 110-1 and 110-2 of the user 110.

Figure 38:
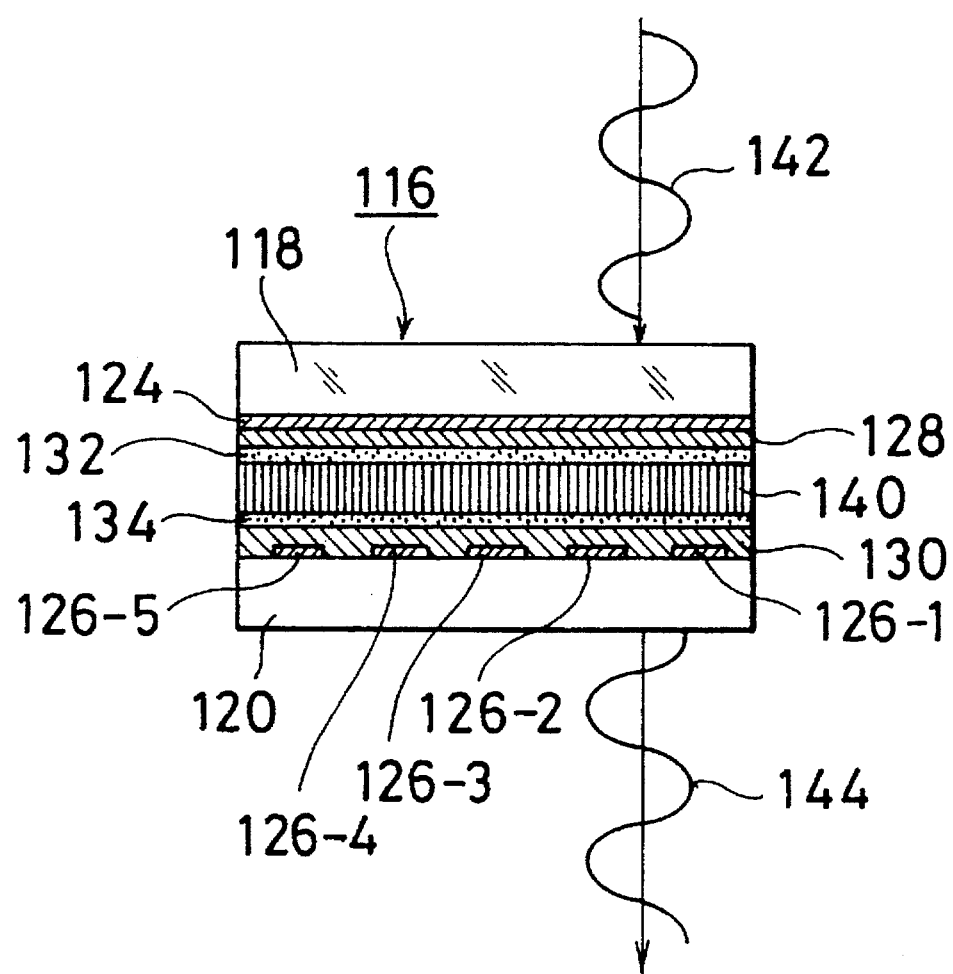
FIG. 38 is an explanatory diagram of a phase display which is used in the invention.

FIG. 38 shows an embodiment of the phase display 116 in FIG. 37. A liquid crystal display is shown as an example. That is, a uniform transparent electrode 124 is provided subsequent to a glass base plate 118 on the incident surface side. Subsequent to a glass base plate 120 on the outgoing side, separated transparent electrodes 126-1 to 126-5, constructing one display segment, are formed. The number of separated transparent electrodes is set to 5 for simplicity of explanation. Subsequent to the transparent electrodes 124 and 126-1 to 126-5, orientation films 132 and 134 are provided through insulative layers 128 and 130. A liquid crystal 140 is provided between the orientation films 132 and 134. The liquid crystal display is driven so that the voltage corresponding to the calculated phase information is applied to liquid crystal cells which are determined by the divided electrodes 126-1 to 126-n. The liquid crystal cell changes a refractive index for the transmitting direction of a reproduction light 142 in accordance with the applied voltage. As mentioned above, since a light 144 which is obtained by phase modulating the reproduction light 142 is transmitted and goes out, the user can observe a solid image.

Figure 39:
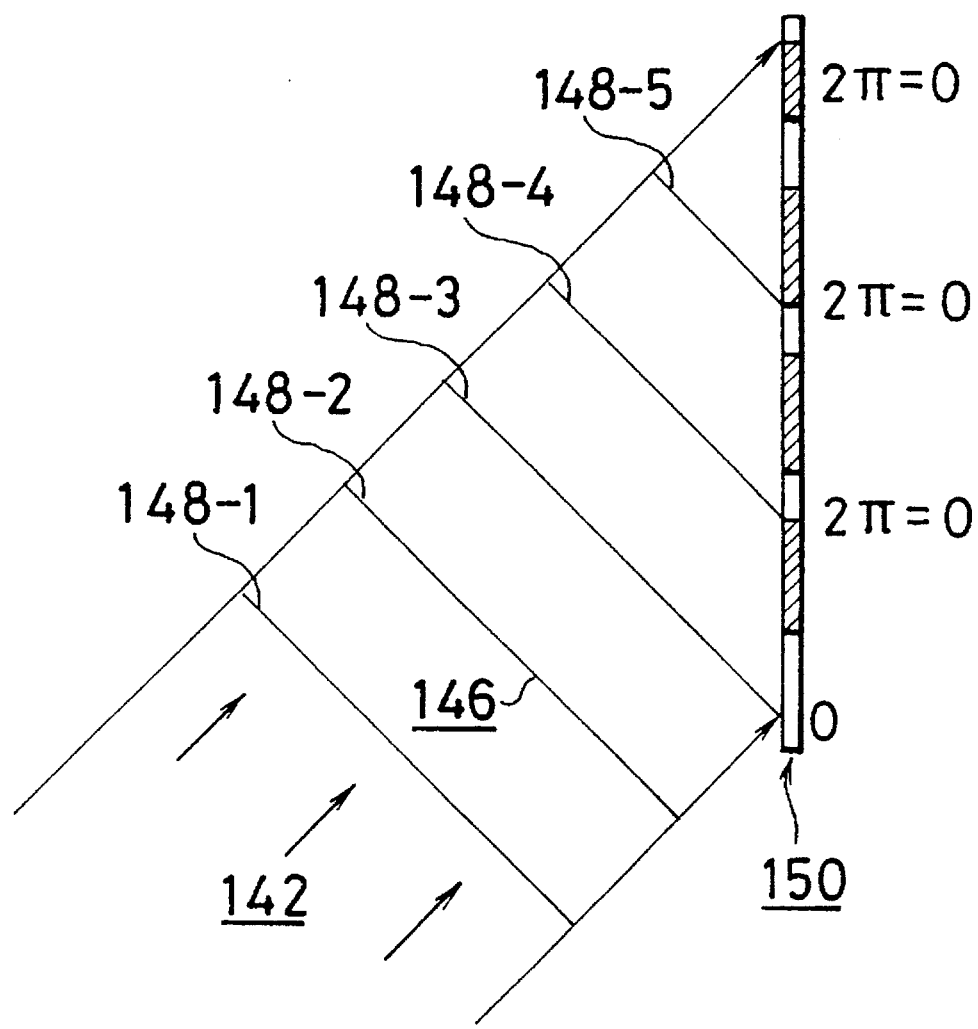
FIG. 39 is an explanatory diagram of a phase display of the invention to perform the amplitude modulation.

FIG. 39 shows another embodiment of a phase display to modulate the amplitude (intensity) of reproduction light. In the embodiment, a plane wave 146 of the reproduction light 142 is obliquely input ted to a liquid crystal 150. The plane wave 146 is sequentially input ted into the liquid crystal 150 so as to have in-phase surfaces 148-1 to 148-5. By changing a transmission factor of the liquid crystal 150, the phase modulation of the reproduction light 142 is executed.

Figure 40:
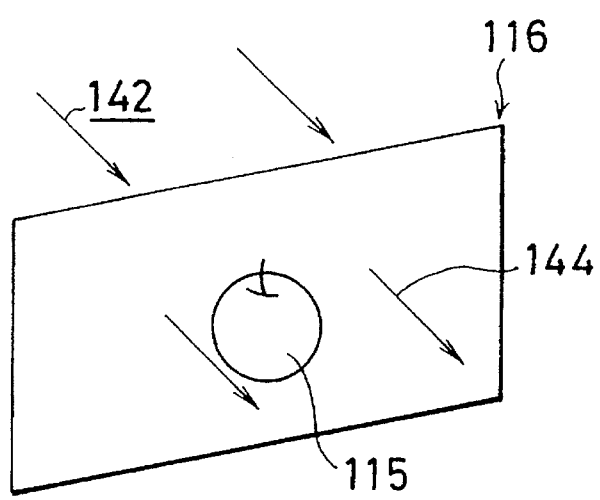
FIG. 40 is an explanatory diagram of a phase display of the transmitting type which is used in the invention.
Figure 41:
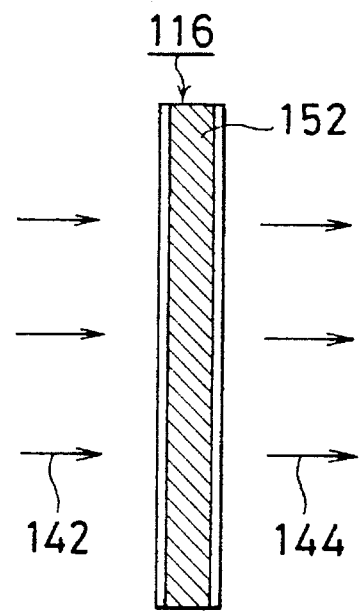
FIG. 41 is an explanatory diagram of an internal structure of FIG. 40.

FIGS. 40 and 41 show a transmitting type display which is used as a phase display of the invention. In the embodiment, the reproduction light 142 is transmitted through the display 116 formed by a liquid crystal 152 and the phase modulation is executed. The user observes the modulated light 144 and, for example, observes a solid image 115 of an apple.

Figure 42:
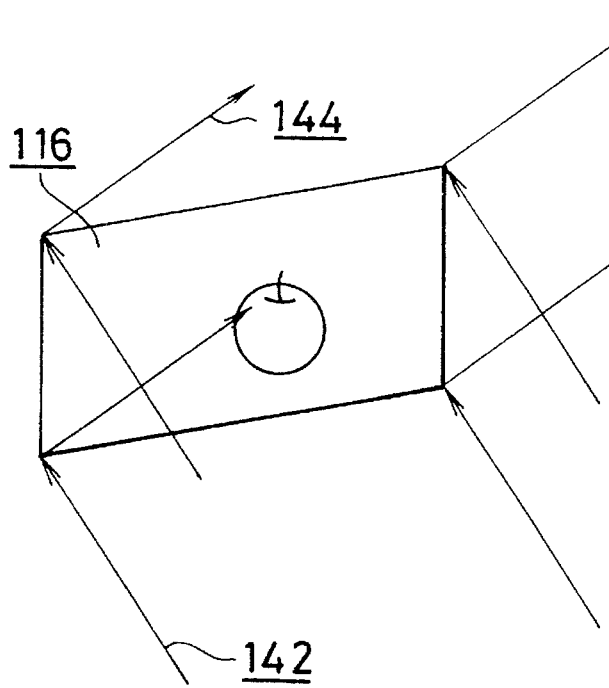
FIG. 42 is an explanatory diagram of a phase display of the reflecting type which is used in the invention.
Figure 43:
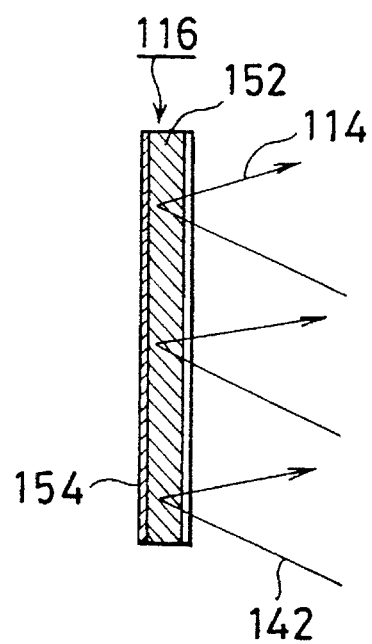
FIG. 43 is an explanatory diagram of an internal structure of FIG. 42.

FIGS. 42 and 43 show a reflecting type display which is used as a phase display of the invention. In the embodiment, one side of the liquid crystal 152 is constructed as a mirror 154 serving as a reflecting surface. The incident reproduction light 142 is reflected by the mirror 154 and is again transferred in the liquid crystal 152.and goes out. Thus, since the reproduction light passes twice in the liquid crystal 152, as compared with the transmitting type display of FIG. 40, it is sufficient to set the thickness to the half thickness in order to obtain the same phase modulation, so that it is advantageous. In this case, a light source to emit the reproduction light needs to be put on the observer side for the display.

Figure 44:
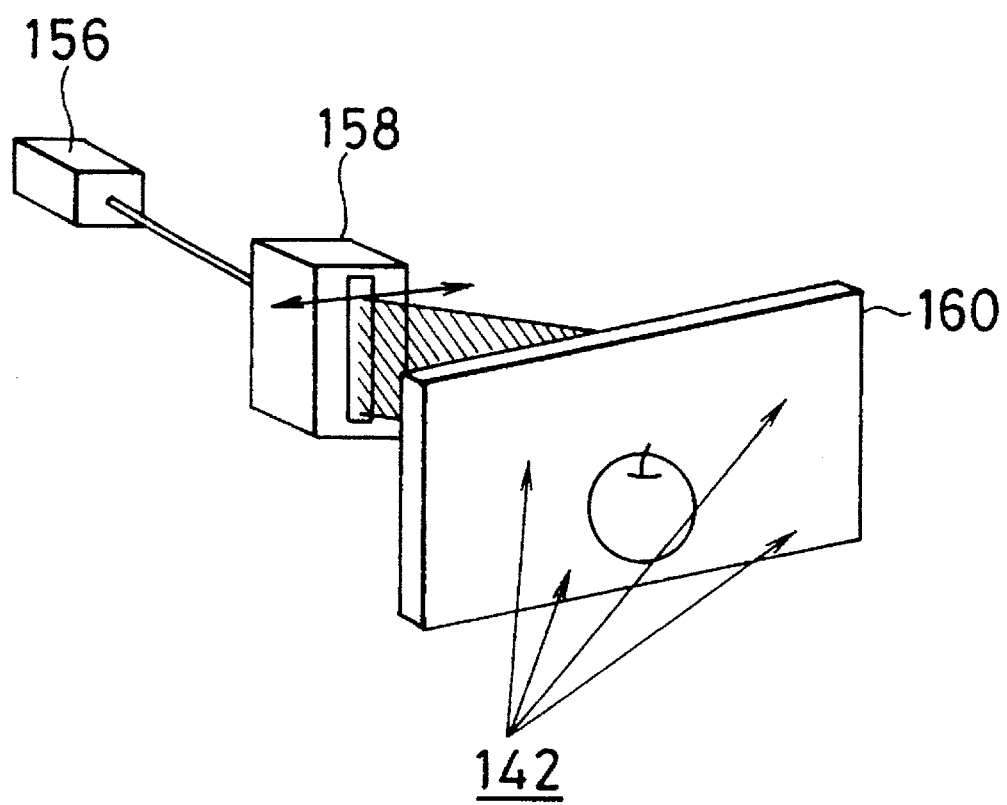
FIG. 44 is an explanatory diagram of a phase display of the optical writing type which is used in the invention.

FIG. 44 shows a light writing type phase display which is used as a phase display of the invention. According to the embodiment, the phase distribution information calculated by the computer is optically written, the reproduction light is phase modulated, and a solid image is observed. A writing light from a laser light source 156 is scanned in the X and Y directions by a laser scanning apparatus 158. The voltage of each element of a light writing type phase display 160 is controlled, thereby changing a refractive index in correspondence to the phase distribution information. The reproduction light 142 is phase modulated and is observed as a solid image of, for example, an apple. By optically writing the phase distribution information into the light writing type phase display 160 as mentioned above, a high resolution can be easily obtained rather than the case of the liquid crystal display of FIG. 38 in which a voltage is applied to the element of the transparent electrode and the voltage corresponding to the phase distribution information is applied.

Figure 45:
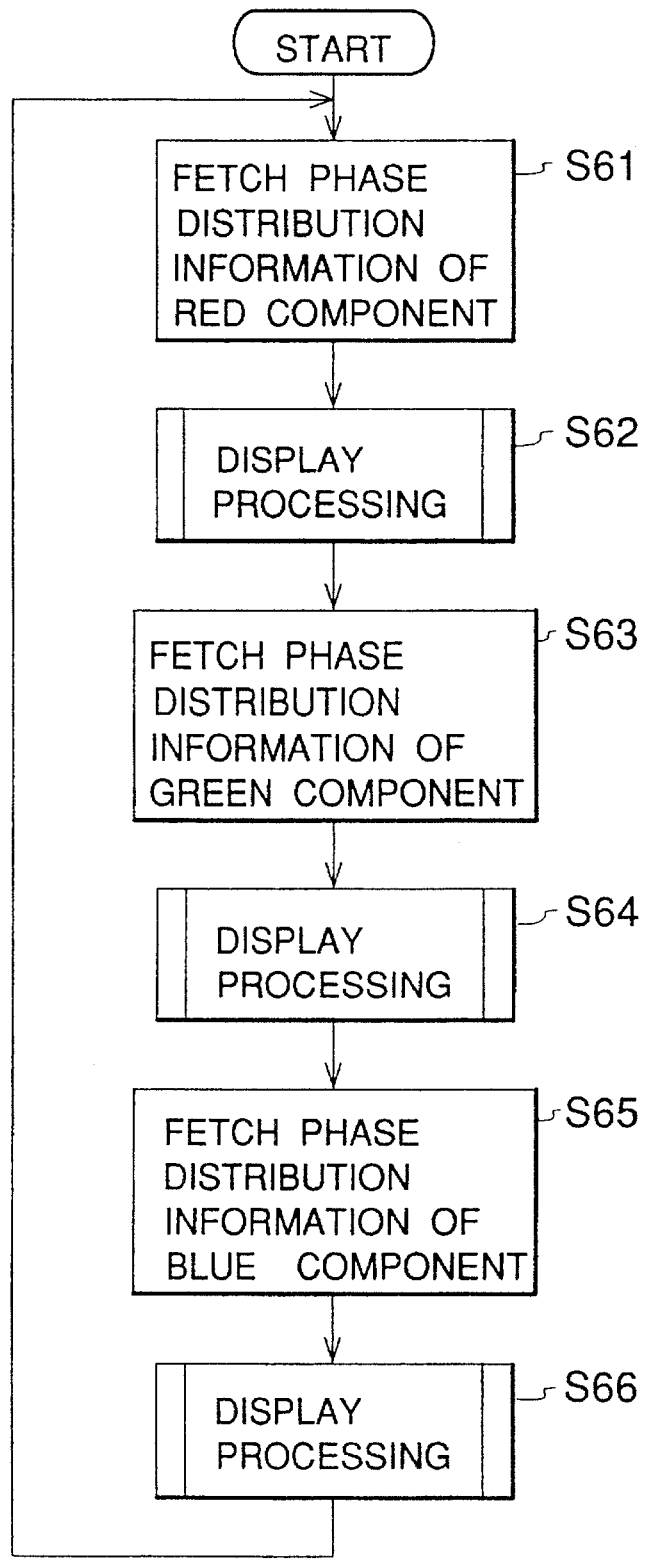
FIG. 45 is a flowchart showing a color stereoscopic display of the invention according to the RGB time division.

FIG. 45 shows the color displaying processes of a solid image according to the invention and relates to the case of RGB displaying an image in a time divisional manner. First, in step S61, the phase distribution information of the red component is fetched. The phase distribution information of the red component is calculated from the 2-dimensional images of the red component. In step S62, the display processes of the phase distribution information of the red component are executed. In detail, the display processes in this instance correspond to the processes in steps S52 to S54 in FIG. 36. That is, the phase distribution information of the red component fetched in step S61 is transferred to the display driver. The display driver drives the phase display for the red component, thereby enabling the user to observe a solid image by irradiating the reproduction light in step S54. In step S63, the phase distribution information of the green component is fetched. In step S64, the display process is executed. In step S65, the phase distribution information of the blue component is fetched. In step S66, the display process is executed. The display processes are time divisionally executed on the basis of the phase distribution information with respect to each of three primary colors of the lights of the red, green, and blue components, thereby enabling a color solid image to be observed.

Figure 46:
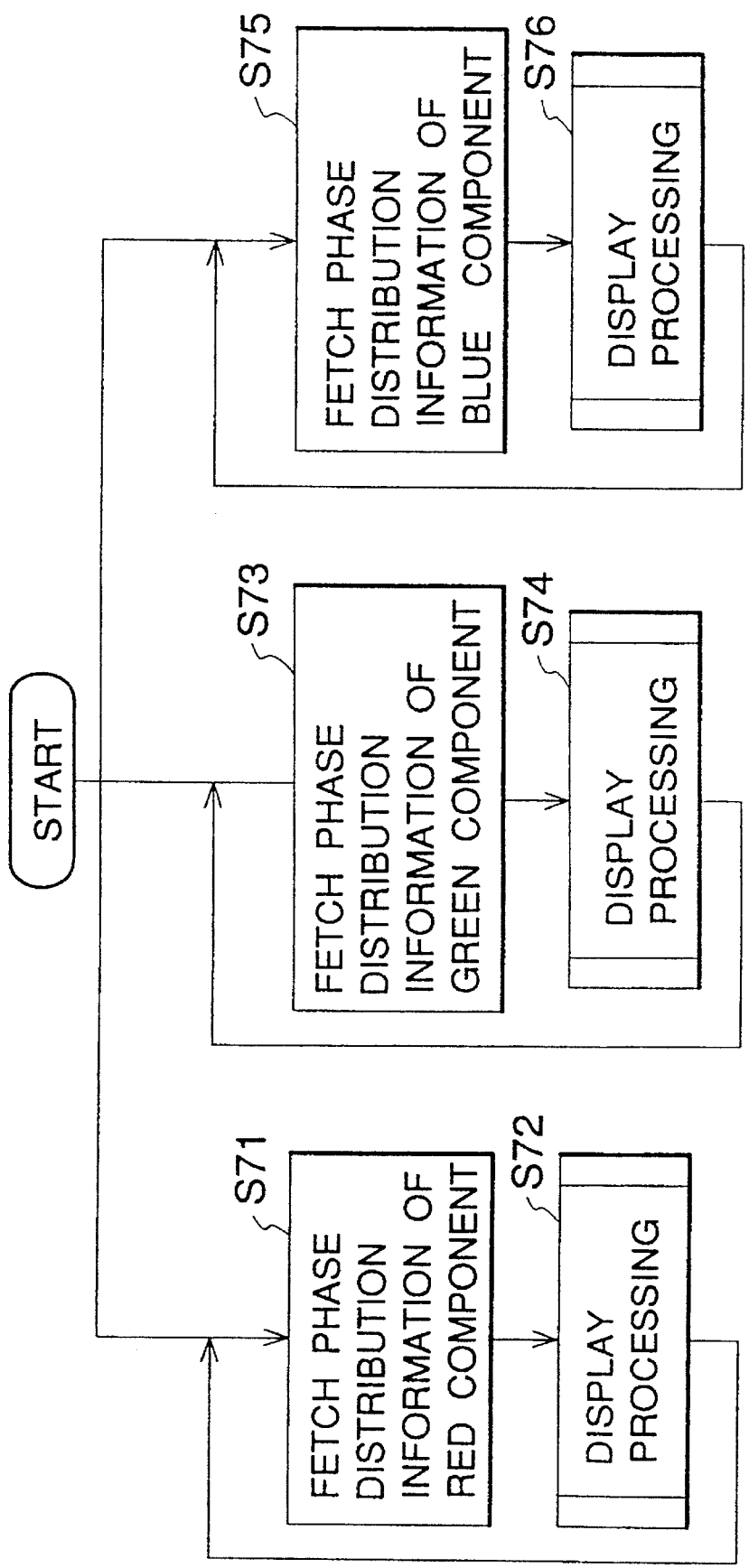
FIG. 46 is a flowchart showing color displaying processes of the invention according to the RGB simultaneous display.

FIG. 46 shows other color display processes of a solid image according to the invention and relates to the case of simultaneously displaying RGB images. First, in step S71, the phase distribution information of the red component is fetched. In step S72, the display process is executed. In a manner similar to the above, the processes in steps S71 and S72 are repeated with respect to the next picture plane. The phase distribution information of the green component is simultaneously fetched in step S73. The display process is executed in step S74. In a manner similar to the above, the processes in steps S73 and S74 are repeated with respect to the next picture plane. Further, the phase distribution information of the blue component is simultaneously fetched in step S75. The display process is executed in step S76. In a manner similar to the above, the processes in steps S75 and S76 are repeated with respect to the next picture plane. As mentioned above, the reproduction lights are simultaneously phase modulated in parallel on the basis of the phase distribution information of three primary colors of the red, green, and blue components. The lights, after completion of the phase modulation are synthesized, enable a color solid image to be observed.

Figure 47:
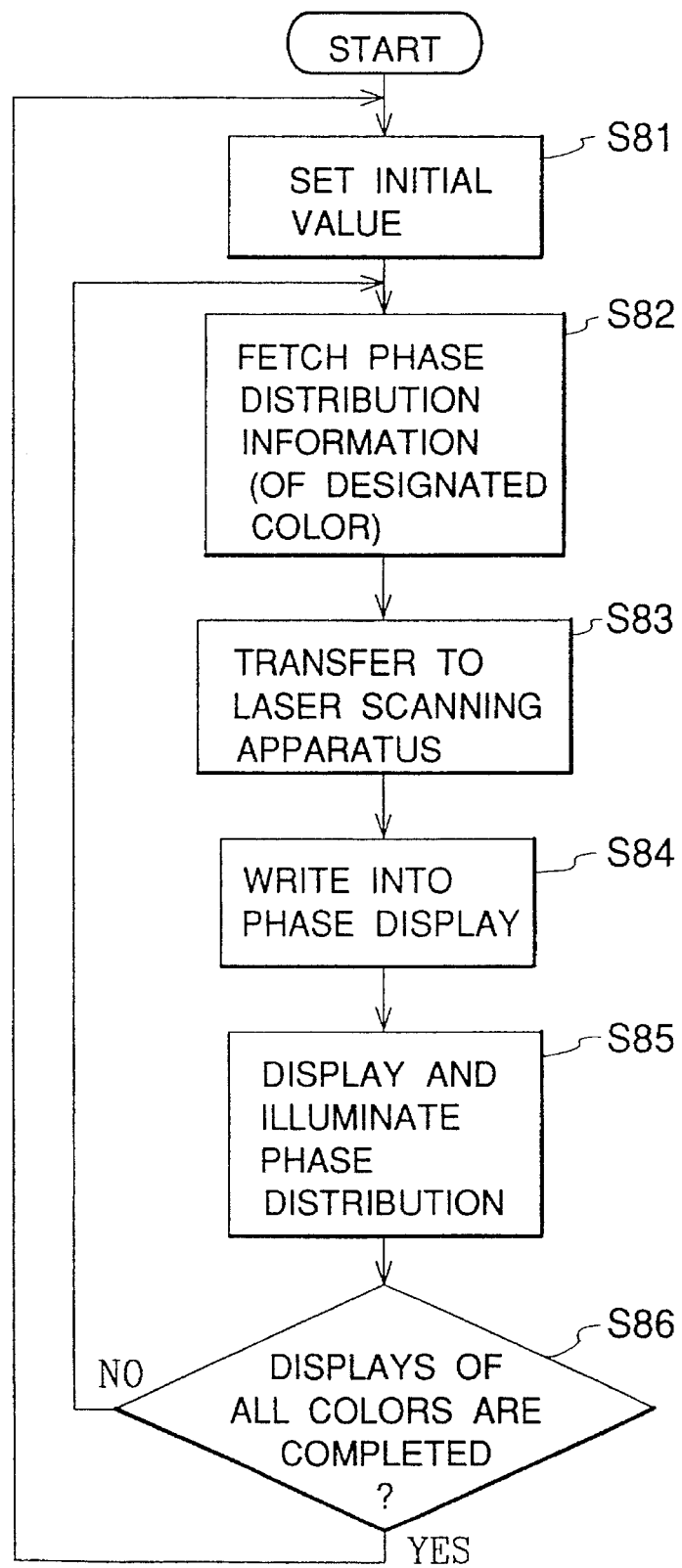
FIG. 47 is a flowchart showing color displaying processes of the invention by the RGB time division and the optical writing.

FIG. 47 shows other color display processes of a solid image according to the invention. The light writing type phase display shown in FIG. 44 is used and the RGB images are time divisionally displayed. First, in step S81, an initial value is set. For example, the phase distribution information of the red component is written as an initial value into the light writing type phase display. In step S82, the phase distribution information of the designated color is fetched. For example, the phase distribution information of the red component is fetched for the first time. The phase distribution information of the green component is fetched at the second time. The phase distribution information of the blue component is fetched at the third time. After that, the above processes are likewise repeated. In the next step S83, the phase distribution information of the color designated in step S82 is transferred to the laser scanning apparatus. In step S84, the phase distribution information is written into the light writing type phase display. In this instance, on the basis of the phase distribution information transferred in step S83, the laser scanning apparatus scans the write light and writes the phase distribution information to the light writing type phase display. The refractive index is changed by controlling the voltage that is applied to each element of the light writing type phase display. In step S85, the phase distribution is displayed and the reproduction light is irradiated. That is, the reproduction light is irradiated to the light writing type phase display and is phase modulated. With respect to the phase modulated light, the user observes a color solid image. In step S86, a check is made to see if the display processes of all of the colors have been finished. If NO, the processing routine is returned to step S82 and the similar processes are repeated with respect to the next color. If YES, the processes in step S81 and subsequent steps are repeated with regard to the next picture plane. By the above processing routine, the laser scanning apparatus writes the phase distribution information into the light writing type phase display on the basis of the phase distribution information of the red, green, and blue components. The reproduction lights of red, green, and blue are sequentially irradiated and phase modulated synchronously with the writing operation. By seeing the phase modulated lights, the observer can observe a color reproduction solid image. Particularly, since the please distribution information has been written into the light writing type phase display by the light by using the laser scanning apparatus, a synthesized color image of red, green, and blue can be observed at a high speed and a high resolution.

Figure 48:
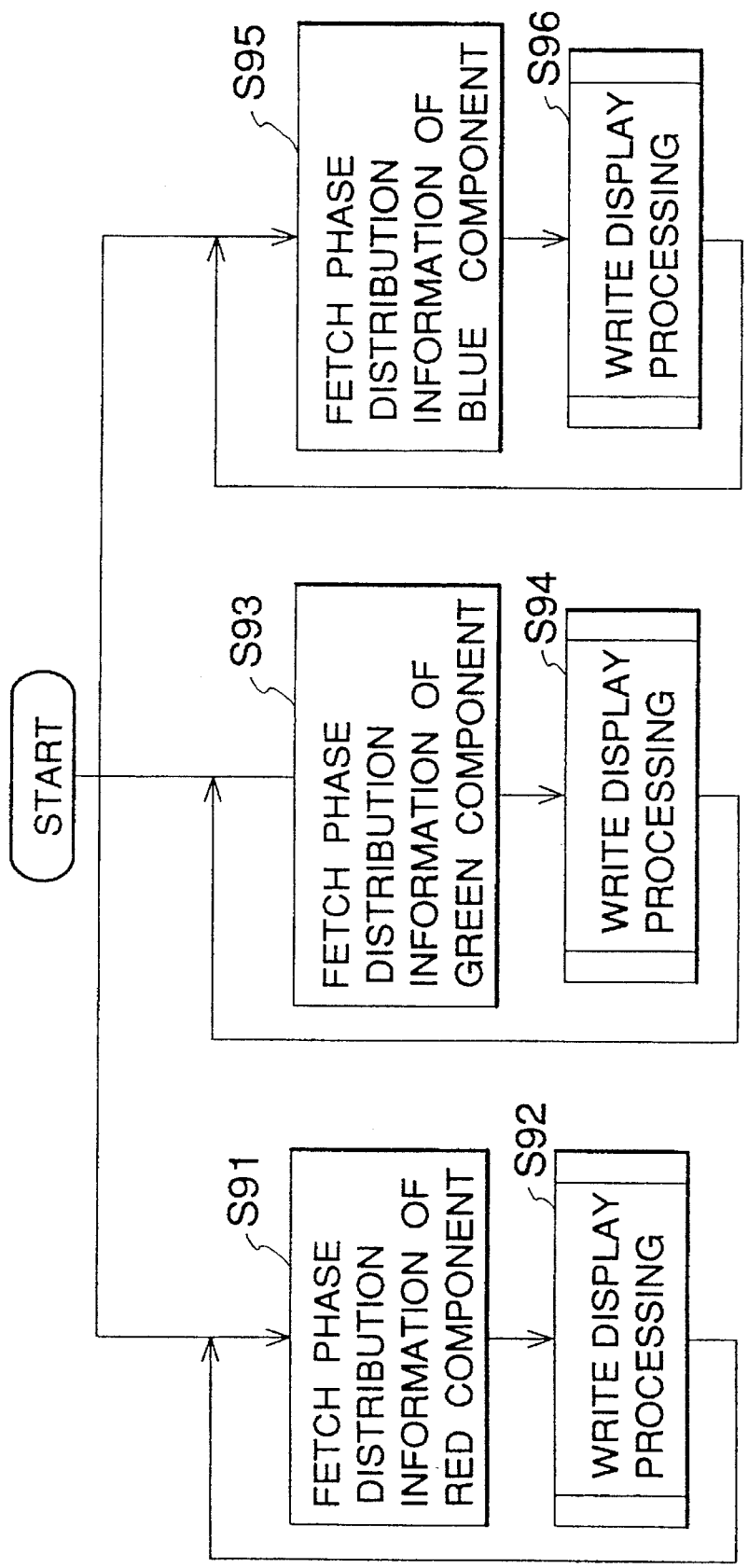
FIG. 48 is a flowchart showing color displaying processes of the invention by the RGB simultaneous display and the optical writing.

FIG. 48 shows other color display processes of a solid image according to the invention. The light writing type phase display shown in FIG. 44 is used and the RGB components are simultaneously displayed in parallel. First, in step S91, the phase distribution information of the red component is fetched. In step S92, the writing display processes are executed. In this instance, the writing display processes correspond to the processes in steps S83 to S85 in FIG. 47. That is, the phase distribution information of the red component fetched in step S91 is transferred to the laser scanning apparatus. In step S84, the laser scanning apparatus writes the phase distribution information into the light writing type phase display apparatus. The information is displayed in step S85. Thus, the user can observe a reproduction solid image of red. The processes in steps S91 and S92 are repeated with regard to the next picture. At the same time, the phase distribution information of the green component is fetched in step S93. The similar writing display processes are executed in step S94. In a manner similar to the above, the processes in steps S93 and S94 are repeated with respect to the next picture plane. Further, the phase distribution information of the blue component is fetched in step S95. The writing and display processes are likewise performed in step S96. In a manner similar to the above, the processes in steps S95 and S96 are performed with respect to the next picture plane. On the basis of the phase distribution information of the red, green, and blue components, each laser scanning apparatus writes the information into each light writing type phase display. The reproduction lights of red, green, and blue are irradiated and are phase modulated. The lights after completion of the phase modulations are synthesized. By seeing the synthesized image, the user can observe a color reproduction solid image. Particularly, since each phase distribution information has been written into the light writing type phase display by the light by each of the laser scanning apparatuses of red, green, and blue, the synthesized color image of red, green, and blue can be observed at a high speed and a high resolution.

Figure 49:
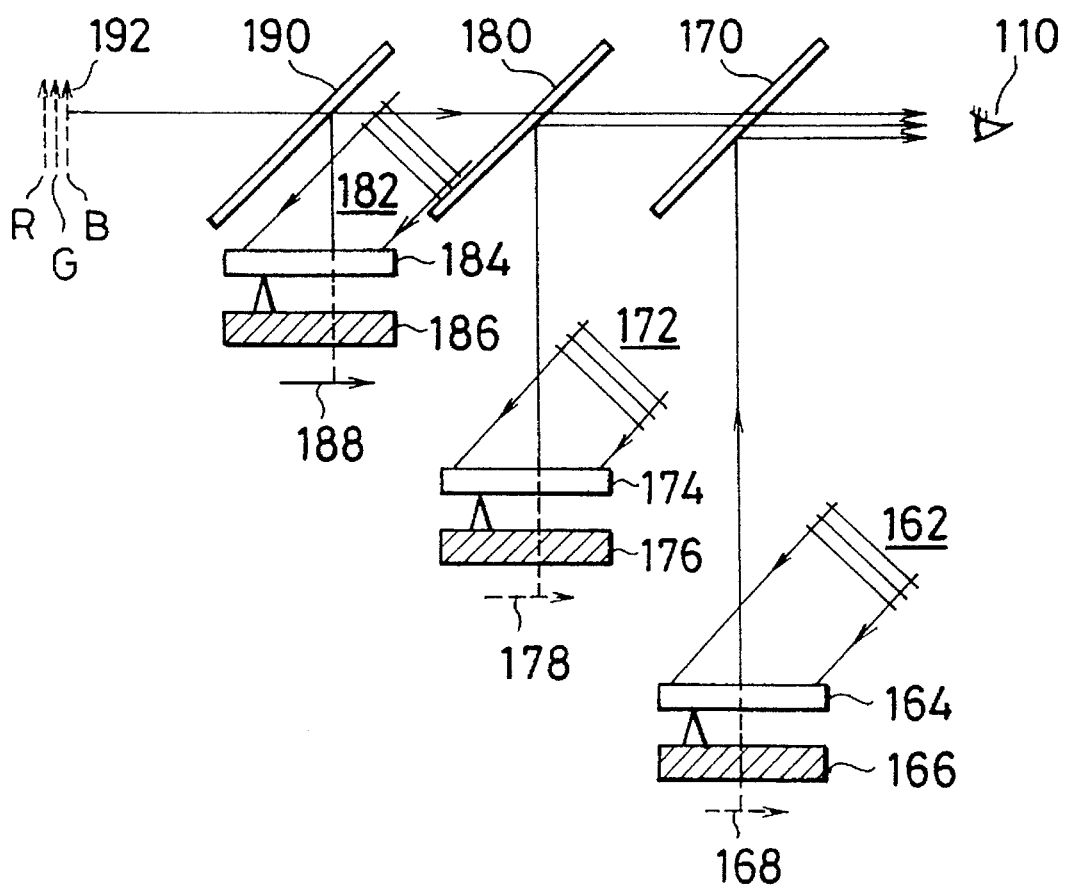
FIG. 49 is an explanatory diagram showing a construction of a color display apparatus of the invention for executing the RGB simultaneous display and the optical writing.

FIG. 49 shows an embodiment for simultaneously displaying the RGB images by using the light writing type phase display of the invention shown in FIG. 48. In the embodiment, three write optical systems 166, 176, and 186 for red, green, and blue, three light writing type phase displays 164, 174, and 184 for red, green, and blue, and three reproduction lights 162, 172, and 182 for red, green, and blue are provided, and the phase modulation is executed by three sets of phase displays 164, 174, and 184. The lights after completion of the modulation are reflected by a mirror 170 to select a wavelength for red, a mirror 180 to select a wavelength for green, and a mirror 190 to select a wavelength for blue and the reflected lights are synthesized. The reproduction images of red, green, and blue after completion of the synthesis are overlapped to one position. Consequently, when the user 110 observes the synthesized image from the right side, color images of three primary colors of red, green, and blue can be observed as a color solid image at the position of the reproduction image on the left side.

Figure 50:
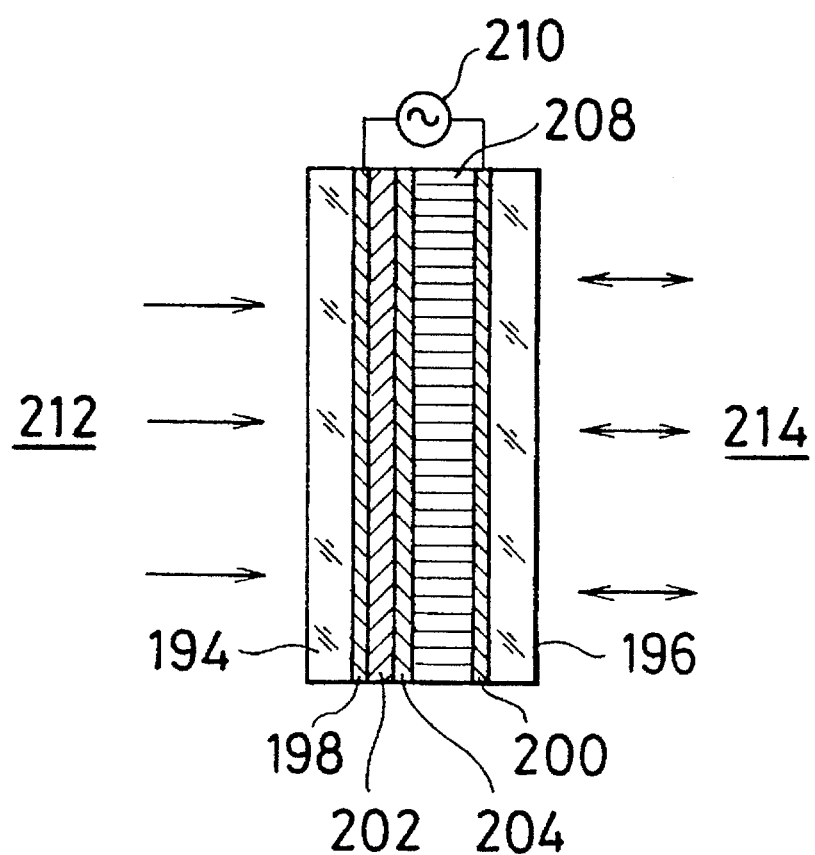
FIG. 50 is an explanatory diagram showing a structure of an optical device of the optical writing type which is used in the invention.

FIG. 50 shows a light writing type optical device which is used for a stereoscopic display according to the invention. The light writing type optical device is constructed in a manner such that a liquid crystal 208 for modulation is sandwiched by transparent electrodes 198 and 200 and a reproduction light 214 entering from the right side is reflected by a dielectric mirror 204. On the other hand, a conductivity (resistance value) of a photoconductive film 202 is changed by a writing light 212 entering from the left side. A voltage which is applied from a transparent electrode voltage source 210 is controlled, thereby changing a refractive index of the liquid crystal 208. With the above construction, when the phase distribution information of red, green, and blue is written at a high speed from the left side by the writing light 212 such as a laser beam or the like and the reproduction lights 214 of red, green, and blue are irradiated from the right side, the light which is reflected by the dielectric mirror 204 and goes out is subjected to the phase modulation. Therefore, by observing the reproduction image from the right side, the observer can observe a color solid image.

Figure 51:
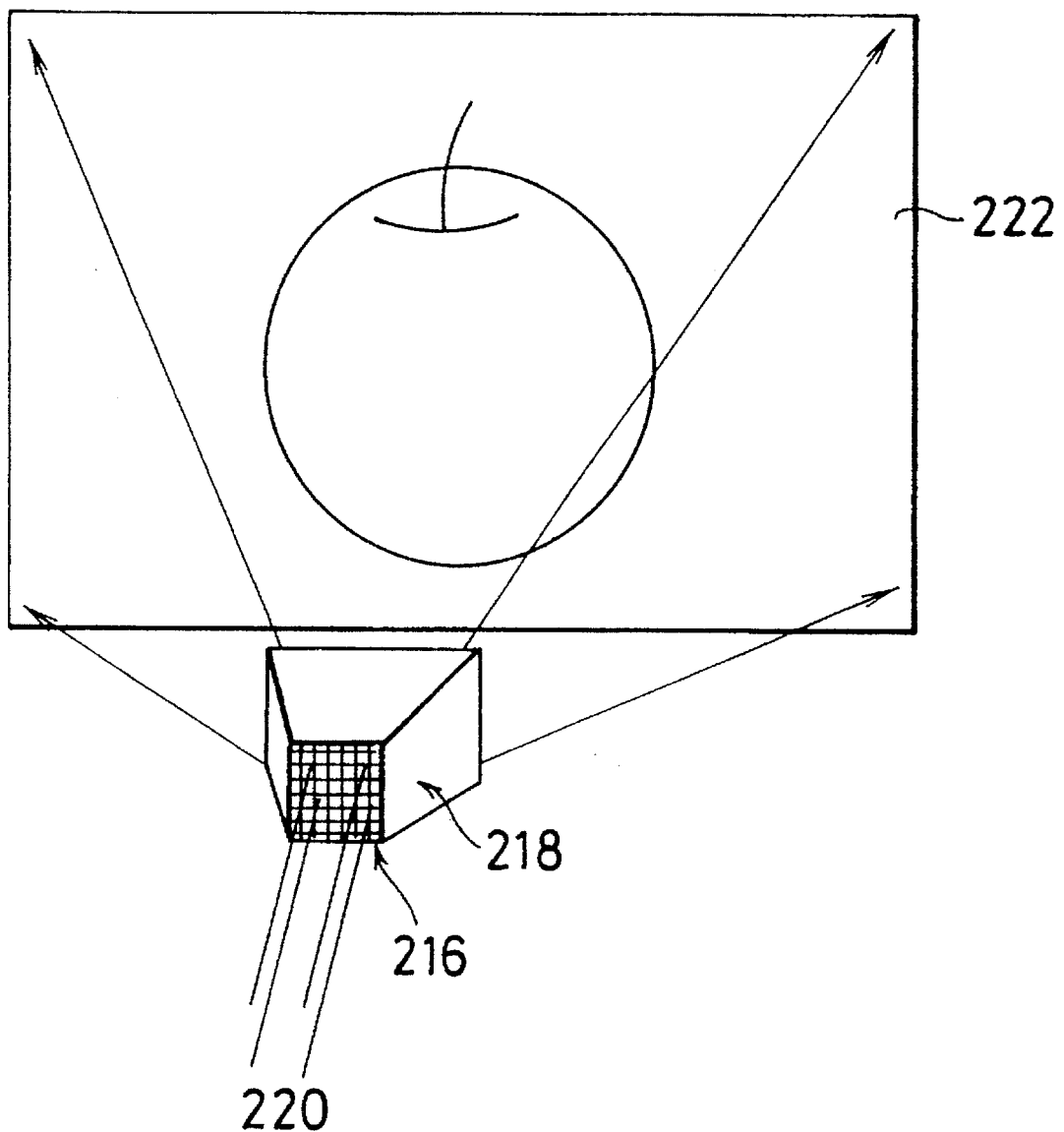
FIG. 51 is an explanatory diagram of a projecting type phase display which is used in the invention.

FIG. 51 shows a projecting type display which is used for a stereoscopic display of the invention. In the embodiment, a reproduction light 220 enters a space light modulator (phase display) 216 and the light which has been phase modulated in accordance with the phase distribution information and transmitted is enlargedly projected to a reflecting type screen 222 by a projecting apparatus 218, thereby allowing the observer to observe a solid image of an apple. In this case, a visual field can be widened by giving a directivity to the screen 222.

Figure 52:
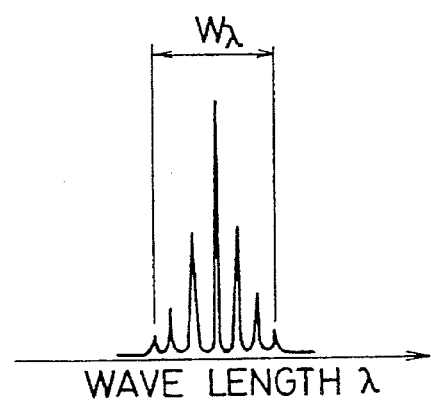
FIG. 52 is an explanatory diagram showing a spectrum distribution of an illuminating light source which is used in the invention.

FIG. 52 shows a spectrum distribution of the reproduction light which is used for a stereoscopic display of the invention. A wavelength spectrum of a semiconductor laser is shown as an example. By using a laser whose wavelength width $W_\lambda$ is equal to or less than a few nanometers, a clear reproduction solid image can be obtained. Although an arbitrary wavelength can be used so long as it lies within a visible region, it is necessary to consider the wavelength of light source which is used for reproduction at the stage of calculating the phase distribution of the hologram. By using a semiconductor laser which generates a red light whose wavelength is on the order of 600 nanometers, a green light whose wavelength is on the order of 500 nanometers, and a blue light whose wavelength is on the order of 400 nanometers, three primary colors of the lights are expressed and a color solid image can be reproduced. With respect to the semiconductor laser of blue, a semiconductor laser using second harmonics can be also used. In addition to the semiconductor lasers, as a reproduction light, it is also possible to produce a light of a narrow wavelength band by combining a light source of a halogen lamp whose bright line and wavelength band are wide such as a gas laser or the like other than the semicondutor laser and optical filters.

Figure 53:
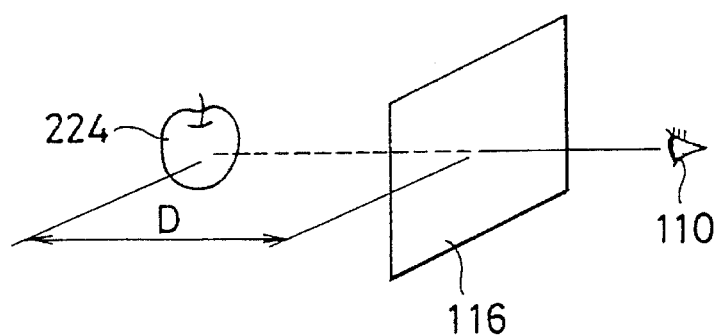
FIG. 53 is an explanatory diagram showing the reproduction of a solid image of the invention using a Fresnel hologram.

FIG. 53 shows a reproduction image of a Fresnel hologram whose phase distribution has been calculated according to the invention. In case of the Fresnel type whose reproduction image 224 is away from the hologram surface by the phase display 116, as a distance D is large, the reproduction image is easily influenced by the color dispersion due to the wavelength width of the reproduction light source. In this case, therefore, it is desirable to use a light source such as a laser or the like having a narrow wavelength band.

Figure 54:
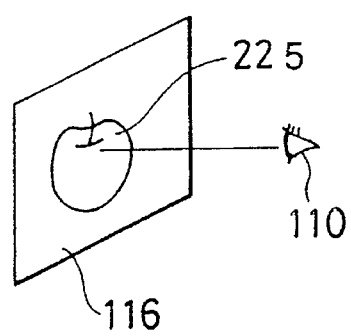
FIG. 54 is an explanatory diagram showing the reproduction of a solid image of the invention using an image hologram.

FIG. 54 shows a reproduction image of an image hologram whose phase distribution has been calculated by the invention. In case of the image type in which the reproduction image 225 appears near the hologram surface of the phase display 116, since the reproduction image is hardly influenced by the color dispersion due to the wavelength width of the reproduction light source. Therefore, even when a wavelength width is slightly wide, a clear reproduction image can be obtained. For example, a bright line (wavelength width is equal to 10 nanometers) of a halogen lamp or the like can be also used.

Figure 55:
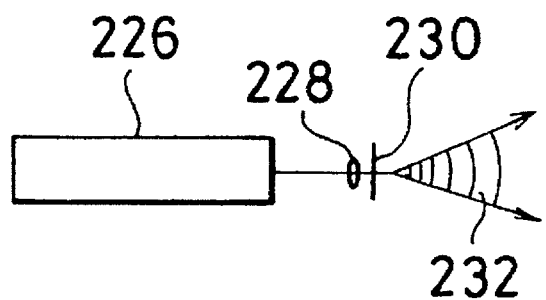
FIG. 55 is an explanatory diagram showing the production of a spherical reproduction wave which is used in the invention.
Figure 56:
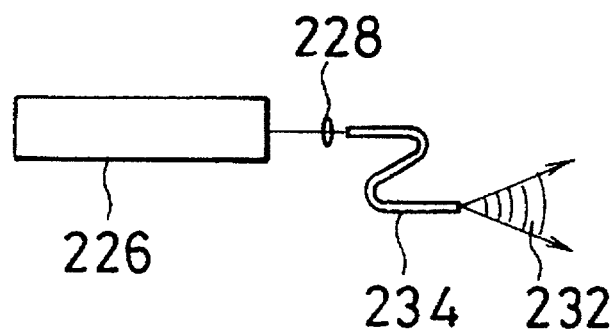
FIG. 56 is an explanatory diagram showing another production of a spherical reproduction wave which is used in the invention.
Figure 57:
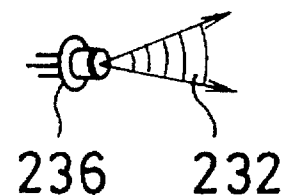
FIG. 57 is an explanatory diagram showing still another production of a spherical reproduction wave which is used in the invention.

The formation of a spherical wave which is used as a reproduction light in the invention will now be described. As a reproduction light of the hologram, it is preferable to use a light of clean wave front such as spherical wave or plane wave from viewpoints of ease of the calculation of the phase distribution and ease of realization of the wave front. FIG. 55 shows a state in which a laser beam from a laser light source 226 is diverged by an objective lens 228 and a pin hole 230 and is converted into a spherical wave 232. FIG. 56 shows a state in which a laser beam from the laser light source 226 enters an optical fiber 234 through the objective lens 228 and goes out from the optical fiber 234 and is converted into the spherical wave 232. Further, FIG. 57 shows a state in which a semiconductor laser 236 which directly emits the spherical wave 232 is used. In case of a halogen lamp or the like, since the light emitting section has an extent, it is difficult to ideally produce a point light source. Therefore, it is necessary to set an illuminating distance to a large value.

FIG. 58 shows an embodiment of a stereoscopic display apparatus of the invention. According to the embodiment, a spherical wave is used as a reproduction light and a phase distributing displayed on a phase display is illuminated. The spherical wave from a point light source 238 is converted into the parallel light by a reflecting type collimating mirror 240. When the parallel light is irradiated to the phase display 116, it is subjected to the modulation by the displayed phase distribution and the operator 110 can see a solid image. In this case, since a part of the light entering the phase display 116 directly passes as a 0-th order light, a hood 242 for shielding the light is provided. FIG. 59 shows an external view of an embodiment of FIG. 58.

FIGS. 60 and 61 show an embodiment of a stereoscopic display apparatus for restricting the outgoing of the 0-th order light of the reproduction light. In the embodiment, a reflecting body is integrated with the phase display 316. A light from a semiconductor laser 248 is reflected by a mirror 250 so that the reproduction light from the semiconductor laser 248 is irradiated to the phase display 316 at an incident angle of a critical angle or more. Since the embodiment relates to a synthesized color display of red, green, and blue as an example, three semiconductor lasers 248, 251, and 252 are provided as shown in FIG. 61.

Figure 62:
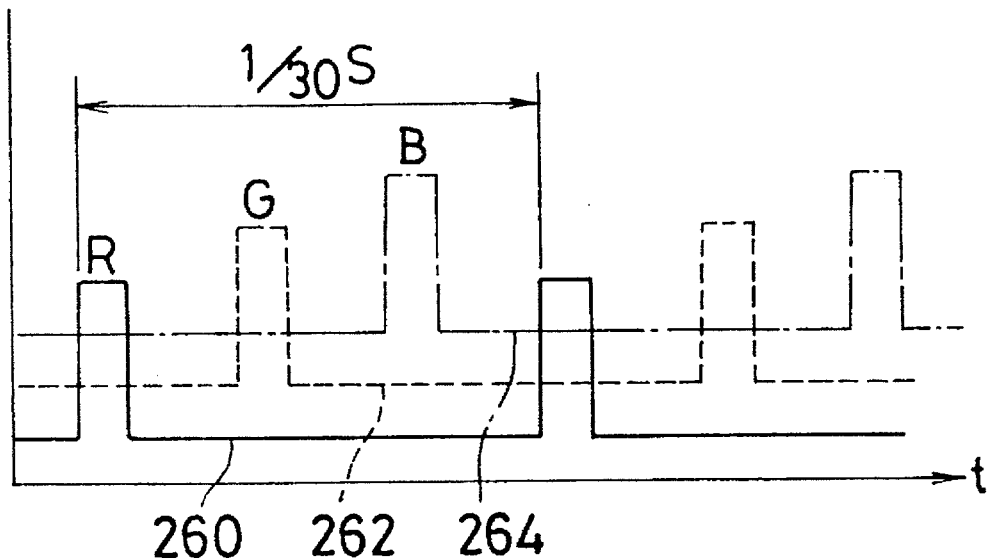
FIG. 62 is a timing chart for the color display by the RGB time division in the invention.

FIG. 62 is a timing chart for displaying a color image by the RGB time divisional manner. To display a color solid image, it is necessary that each phase distribution information is calculated from a set of the 2-dimensional images corresponding to each of three primary colors of red, green, and blue and the phase distribution information is displayed by the phase display and the reproduction light of each color is phase modulated and a color solid image is produced. For this purpose, a red timing signal 260, a green timing signal 262, and a blue timing signal 264 having leading portions for generating the reproduction lights of red, green, and blue are sequentially generated at a period of 1/30 second and with a phase difference of 1/90 second, respectively. It is sufficient that the display or writing operation of the phase information after the reproduction lights were generated is executed for a period of time until the next leading edge. As mentioned above, three reproduction lights of red, green, and blue are sequentially generated within 1/30 second and modulated by the phase distribution information of each color, thereby reproducing a color solid image.

Figure 63:
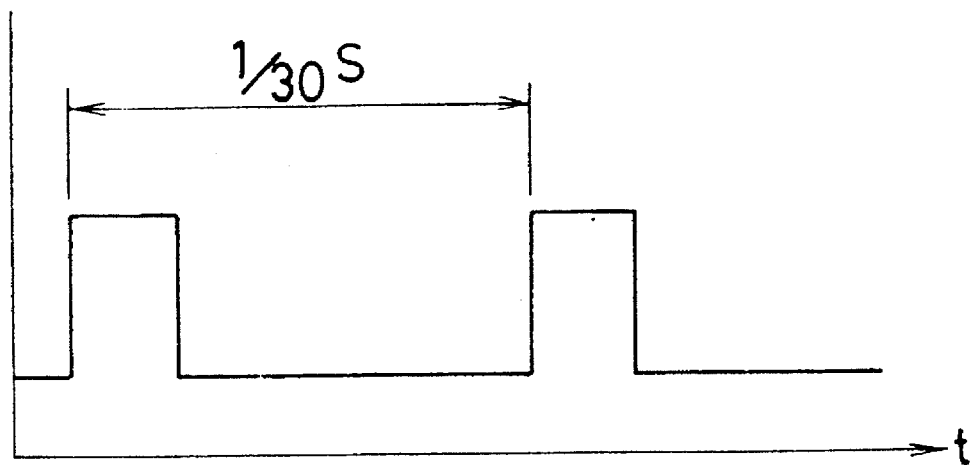
FIG. 63 is a timing chart for the RGB simultaneous display in the invention.

FIG. 63 shows a timing chart for displaying color image by the RGB simultaneous displaying manner. In this case, the reproduction lights of red, green, and blue are irradiated at the leading edge portions of every period of 1/30 second. The phase distribution information of red, green, and blue is expressed or written in the phase display at the trailing edge portions and the reproduction lights are modulated. By seeing a synthesized light of the modulated lights, the observer can observe a color solid image.

The present invention is not limited by the numerical values shown in the above embodiments. The present invention is not limited to the foregoing embodiments but many variations and modifications are possible within the spirit and scope of the appended claims of the invention.

What is claimed is:

1. A stereoscopic display apparatus comprising:

input means, including image pickup means, for setting a virtual plane in which a plurality of visual point positions are two-dimensionally arranged for an object to be displayed, for arranging said image pickup means at each of said visual point positions, and for inputting a plurality of 2-dimensional image data obtained by photographing said object, by said image pickup means;

interpolation image forming means for forming 2-dimensional image data between two of said plurality of 2-dimensional image data obtained by photographing the same object from two different positions by an interpolation calculation on the basis of said two 2-dimensional image data;

phase distribution calculating means for dividing a virtual hologram plane which forms a 2-dimensional holographic interference pattern, 2-dimensional phase pattern, in the horizontal and vertical directions, for setting distribution segments, and for calculating segment values of said 2-dimensional holographic interference pattern from said 2-dimensional image data at the corresponding visual point position for each of said distribution segments; and phase expressing means for irradiating a reproduction light in a state in which the segment value of each of said distribution segments calculated by said phase distribution calculating means is expressed on a hologram forming plane, and for converting said reproduction light into an optical wave front, thereby displaying a stereoscopic image.

2. An apparatus according to claim 1, wherein said input means includes image size changing means for one of reducing and enlarging on the basis of the 2-dimensional image data of different visual directions.

3. An apparatus according to claim 1, wherein said input means includes coordinate moving means for moving coordinate positions of the 2-dimensional image data of different visual directions.

4. An apparatus according to claim 1, wherein said phase distribution calculating means calculates a value of each of said distribution segments from the 2-dimensional image data of a region which is determined in accordance with a predetermined visual recognizing region.

5. An apparatus according to claim 1, wherein said phase distribution calculating means calculates the segment value of each of said distribution segments with respect to only pixels in a portion where an image exists with regard to the 2-dimensional images inputted from said input means.

6. An apparatus according to claim 1, wherein said phase expressing means spatially modulates a phase of the reproduction light and optically converts the reproduction light to a wave front.

7. An apparatus according to claim 1, wherein said phase expressing means modulates an amplitude of the reproduction light and optically converts the reproduction light to a wave front.

8. An apparatus according to claim 1, wherein:

said input means inputs the 2-dimensional image data for a plurality of colors as said 2-dimensional image data;

said phase distribution calculating means calculates the value of each of said distribution segments on the basis of the 2-dimensional image data for each of said plurality of color components; and said phase expressing means irradiates the reproduction light of each color in a state in which the value of each of said distribution segments calculated is expressed on a hologram forming plane for each of said plurality of color components and converts the reproduction light into an optical wave front, thereby displaying a color stereoscopic image.

9. A stereoscopic display method comprising:

an input step of setting a virtual plane in which a plurality of visual point positions are two-dimensionally arranged for an object to be displayed and for inputting a plurality of 2-dimensional image data obtained by photographing said object at each of said visual point positions;

interpolation image forming means for forming 2-dimensional image data between two of said plurality of 2-dimensional image data obtained by photographing the same object from two different positions by an interpolation calculation on the basis of said two 2-dimensional image data;

a phase distribution calculating step of dividing a virtual hologram plane which forms a 2-dimensional holographic interference pattern, 2-dimensional phase pattern, in the horizontal and vertical directions and setting distribution segments and calculating segment values of said 2-dimensional holographic interference pattern from said 2-dimensional image data at the corresponding visual point position for each of said distribution segments; and a phase expressing step of irradiating a reproduction light in a state in which the value of each of said distribution segments calculated by said phase distribution calculating step is expressed on the hologram forming plane and converting into an optical wave front, thereby displaying a stereoscopic image.

10. A method according to claim 9, wherein said input step includes an image size changing step for one of reducing and enlarging on the basis of the 2-dimensional image data of different visual directions.

11. A method according to claim 9, wherein said input step includes a coordinate moving step of moving coordinate positions of said 2-dimensional image data of different visual directions.

12. A stereoscopic display apparatus comprising:

input means, including image pickup means, for setting a virtual plane in which a plurality of visual point positions are two-dimensionally arranged for an object to be displayed, for arranging said image pickup means at each of said visual point positions, and for inputting a plurality of 2-dimensional image data obtained by photographing said object, by said image pickup means;

three-dimensional image forming means for forming three-dimensional data on the basis of said plurality of 2-dimensional image data inputted by said input means and for forming a plurality of 2-dimensional images of different visual directions from said three-dimensional data;

phase distribution calculating means for dividing a virtual hologram plane which forms a 2-dimensional holographic interference pattern, 2-dimensional phase pattern, in the horizontal and vertical directions, for setting distribution segments, and for calculating segment values of said 2-dimensional holographic interference pattern from said 2-dimensional image data at the corresponding visual point position for each of said distribution segments; and phase expressing means for irradiating a reproduction light in a state in which the segment value of each of said distribution segments calculated by said phase distribution calculating means is expressed on a hologram forming plane, and for converting said reproduction light into an optical wave front, thereby displaying a stereoscopic image.

13. A stereoscopic display method comprising:

an input step of setting a virtual plane in which a plurality of visual point positions are two-dimensionally arranged for an object to be displayed and for inputting a plurality of 2-dimensional image data obtained by photographing said object at each of said visual point positions;

3-dimensional data forming step for forming three-dimensional data based on said plurality of 2-dimensional image data obtained by photographing the object to be expressed from arbitrary positions and forming a plurality of 2-dimensional images of different visual directions from said 3-dimensional data;

a phase distribution calculating step of dividing a virtual hologram plane which forms a 2-dimensional holographic interference pattern, 2-dimensional phase pattern, in the horizontal and vertical directions and setting distribution segments and calculating segment values of said 2-dimensional holographic interference pattern from said 2-dimensional image data at the corresponding visual point position for each of said distribution segments; and a phase expressing step of irradiating a reproduction light in a state in which the value of each of said distribution segments calculated by said phase distribution calculating step is expressed on the hologram forming plane and converting into an optical wave front, thereby displaying a stereoscopic image.

* * * * *